US012154502B2

(12) United States Patent
Cao

(10) Patent No.: US 12,154,502 B2
(45) Date of Patent: Nov. 26, 2024

(54) PIXEL CIRCUIT, DRIVING METHOD THEREOF, DISPLAY SUBSTRATE AND DISPLAY APPARATUS

(71) Applicants: Chengdu BOE Optoelectronics Technology Co., Ltd., Sichuan (CN); BOE TECHNOLOGY GROUP CO., LTD., Beijing (CN)

(72) Inventor: Xilei Cao, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,904

(22) PCT Filed: Oct. 29, 2021

(86) PCT No.: PCT/CN2021/127285
§ 371 (c)(1),
(2) Date: Sep. 23, 2022

(87) PCT Pub. No.: WO2022/217891
PCT Pub. Date: Oct. 20, 2022

(65) Prior Publication Data

US 2024/0212605 A1 Jun. 27, 2024

(30) Foreign Application Priority Data

Apr. 14, 2021 (CN) ......................... 202110400615.3

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC ............... G09G 3/3233; G09G 3/3266; G09G 2300/0842; G09G 2310/061; G09G 2310/08; G09G 2320/0247
See application file for complete search history.

(56) References Cited

U.S. PATENT DOCUMENTS 12,020,641 B2 * 6/2024 Yin ...................... G09G 3/3233
2016/0171919 A1 6/2016 Cao et al.
2022/0351671 A1 * 11/2022 Xu ........................... G09G 3/32

FOREIGN PATENT DOCUMENTS

CN 107358915 A 11/2017
CN 107610652 A 1/2018
(Continued)

OTHER PUBLICATIONS

China Patent Office, First Office Action issued Dec. 14, 2021 for application No. CN202110400615.3.

*Primary Examiner* — Amare Mengistu
*Assistant Examiner* — Sarvesh J Nadkarni
(74) *Attorney, Agent, or Firm* — HOUTTEMAN LAW LLC

(57) ABSTRACT

A pixel circuit is provided to include a first reset sub-circuit, a data writing and compensating sub-circuit, a light emitting control sub-circuit and a driving transistor; the pixel circuit has first, second and light emitting control signal lines providing first, second and light emitting control signals, respectively; the first reset sub-circuit writes a first reset voltage to the control electrode of the driving transistor under the first control signal in a first level state; the data writing and compensating sub-circuit writes a data voltage to the first electrode of the driving transistor under the second control signal in a second level state, writes a data compensating voltage to the control electrode under the light emitting control signal in a second level state; the light emitting control sub-circuit writes a first operating voltage to
(Continued)

the first electrode under the light emitting control signal in a first level state.

20 Claims, 12 Drawing Sheets

(52) U.S. Cl.
CPC ................ *G09G 2310/061* (2013.01); *G09G 2310/08* (2013.01); *G09G 2320/0247* (2013.01)

(56) References Cited

FOREIGN PATENT DOCUMENTS

| | | | |
|---|---|---|---|
| CN | 107680537 | A | 2/2018 |
| CN | 108492782 | A | 9/2018 |
| CN | 109887466 | A | 6/2019 |
| CN | 111613180 | A | 9/2020 |
| CN | 111833812 | A | 10/2020 |
| CN | 112509518 | A | 3/2021 |
| CN | 113112955 | A | 7/2021 |
| WO | 2013071513 | A1 | 5/2013 |

* cited by examiner

PIXEL CIRCUIT, DRIVING METHOD THEREOF, DISPLAY SUBSTRATE AND DISPLAY APPARATUS

TECHNICAL FIELD

The present disclosure relates to the field of display technology, and in particular to a pixel circuit, a driving method thereof, a display substrate and a display apparatus.

BACKGROUND

Generally, a plurality of types of control signal lines are provided in a display region of a display panel, and waveforms of signals applied to different control signal lines are different from each other. For each type of control signal line, a corresponding driving circuit is disposed in a peripheral region of the display panel.

At present, a pixel circuit generally undergoes a reset stage, a data writing and compensating stage, and a light emitting stage in an operating process; in the related art, in order to control each operating stage, the pixel circuit is generally provided with at least three different types of control signal lines including a reset control signal line, a gate line, and a light emitting control signal line; and waveforms of any two of a reset control signal loaded in the reset control signal line, a gate scanning signal loaded in the gate line, and a light emitting control signal loaded in the light emitting control signal line are different from each other. Therefore, at least three independent driving circuits are disposed in the peripheral region to provide signals for the reset control signal line, the gate line, and the light emitting control signal line, respectively.

In addition, with the increase of the number of internal functions of the pixel circuit, the types of the control signal lines configured for the pixel circuit are increased, and the number of the driving circuits required to be arranged in the peripheral region is correspondingly increased, which is not favorable for a narrow frame.

SUMMARY

The present disclosure is directed to at least one of the technical problems in the related art, and provides a pixel circuit, a driving method thereof, a display substrate, and a display apparatus.

In a first aspect, an embodiment of the present disclosure provides a pixel circuit, including: a first reset sub-circuit, a data writing and compensating sub-circuit, a light emitting control sub-circuit and a driving transistor; wherein the pixel circuit is configured with a first control signal line configured to provide a first control signal, a second control signal line configured to provide a second control signal and a light emitting control signal line configured to provide a light emitting control signal; the first control signal and the second control signal have the same waveform and the second control signal lags behind the first control signal;

the first reset sub-circuit is coupled to a first reset voltage terminal, a control electrode of the driving transistor and the first control signal line, and configured to write a first reset voltage provided by the first reset voltage terminal to the control electrode of the driving transistor in response to a control of the first control signal in a first level state;

the data writing and compensating sub-circuit is coupled to a data line, a first electrode, a second electrode and the control electrode of the driving transistor, the second control signal line, and the light emitting control signal line, and configured to write a data voltage provided from the data line to the first electrode of the driving transistor in response to a control of the second control signal in a second level state, and write a data compensating voltage to the control electrode of the driving transistor in response to a control of the light emitting control signal in a second level state, wherein the data compensating voltage is equal to a sum of the data voltage and a threshold voltage of the driving transistor;

the light emitting control sub-circuit is coupled to a first operating voltage terminal, the first electrode of the driving transistor, and the light emitting control signal line, and configured to write a first operating voltage provided from the first operating voltage terminal to the first electrode of the driving transistor in response to a control of the light emitting control signal in a first level state; and the second electrode of the driving transistor is coupled to a first terminal of a light emitting device, and the driving transistor is configured to output a corresponding driving current in response to a control of the data compensating voltage.

In some embodiments, the first reset sub-circuit includes a first transistor, the data writing and compensating sub-circuit includes a second transistor and a third transistor, and the light emitting control sub-circuit includes a fourth transistor;

a control electrode of the first transistor is coupled to the first control signal line, a first electrode of the first transistor is coupled to the control electrode of the driving transistor, and a second electrode of the first transistor is coupled to the first reset voltage terminal;

a control electrode of the second transistor is coupled to the light emitting control signal line, a first electrode of the second transistor is coupled to the control electrode of the driving transistor, and a second electrode of the first transistor is coupled to the second electrode of the driving transistor;

a control electrode of the third transistor is coupled to the second control signal line, a first electrode of the third transistor is coupled to the first electrode of the driving transistor, and a second electrode of the third transistor is coupled to the data line; and a control electrode of the fourth transistor is coupled to the light emitting control signal line, a first electrode of the fourth transistor is coupled to the first operating voltage terminal, and a second electrode of the fourth transistor is coupled to the first electrode of the driving transistor.

In some embodiments, the first level state is a low level state and the second level state is a high level state; and the first transistor is an N-type transistor, the second transistor is an N-type transistor, the third transistor is an N-type transistor, the fourth transistor is a P-type transistor, and the driving transistor is a P-type transistor.

In some embodiments, the pixel circuit further includes: a storage capacitor;

wherein a first terminal of the storage capacitor is coupled to the control electrode of the driving transistor, and a second terminal of the storage capacitor is coupled to the first operating voltage terminal.

In some embodiments, the pixel circuit further includes: a false light emitting preventing sub-circuit between the second electrode of the driving transistor and the first terminal of the light emitting device, and coupled to the second control signal line, and configured to electrically connect the second electrode of the driving transistor to the first terminal of the light emitting device in response to a control of the second control signal in a first level state, and electrically disconnect the second electrode of the driving transistor from the first terminal of the light emitting device in response to a control of the second control signal in a second level state.

In some embodiments, the false light emitting preventing sub-circuit includes: a fifth transistor; and a control electrode of the fifth transistor is coupled to the second control signal line, a first electrode of the fifth transistor is coupled to the second electrode of the driving transistor, and a second electrode of the fifth transistor is coupled to the first terminal of the light emitting device.

In some embodiments, the first level state is a low level state and the second level state is a high level state; and the fifth transistor is a P-type transistor.

In some embodiments, the pixel circuit further includes: a second reset sub-circuit coupled to a second reset voltage terminal, the first terminal of the light emitting device, and the light emitting control signal line, and configured to write a second reset voltage provided from the second reset voltage terminal to the first terminal of the light emitting device in response to a control of the light emitting control signal in a second level state.

In some embodiments, the second reset sub-circuit includes: a sixth transistor; and a control electrode of the sixth transistor is coupled to the light emitting control signal line, a first electrode of the sixth transistor is coupled to the first terminal of the light emitting device, and a second electrode of the sixth transistor is coupled to the second reset voltage terminal.

In some embodiments, the first level state is a low level state and the second level state is a high level state; and the sixth transistor is an N-type transistor.

In some embodiments, the second reset voltage is greater than or equal to the first reset voltage.

In a second aspect, an embodiment of the present disclosure further provides a display substrate, including: the pixel circuit as provided in the first aspect.

In some embodiments, the display substrate includes a display region in which a plurality of gate lines, a plurality of data lines, a plurality of light emitting control signal lines, and a plurality of pixel units defined by the plurality of gate lines and the plurality of data lines are arranged, each pixel unit corresponds to one gate line, one data line, and one light emitting control signal line, and includes the pixel circuit and the light emitting device;

the second control signal line configured for the pixel circuit is a gate line corresponding to a pixel unit to which the pixel circuit belongs; and the first control signal line configured for the pixel circuit is a gate line before the gate line corresponding to the pixel unit to which the pixel circuit belongs.

In some embodiments, the display substrate further includes a peripheral region in which a gate driving circuit and a light emitting control driving circuit are arranged;

the gate driving circuit is configured with a plurality of first signal output terminals capable of sequentially outputting gate scan signals, the plurality of first signal output terminals are in one-to-one correspondence with the gate lines, and each first signal output terminal is coupled to a corresponding gate line; and the light emitting control driving circuit is configured with a plurality of second signal output terminals capable of sequentially outputting light emitting control signals, the plurality of second signal output terminals are in one-to-one correspondence with the light emitting control signal lines, and each second signal output terminal is coupled to a corresponding light emitting control signal line.

In a third aspect, an embodiment of the present disclosure further provides a display apparatus, including: the display substrate as provided in the second aspect.

In a fourth aspect, an embodiment of the present disclosure further provides a pixel driving method, wherein based on the pixel circuit provided in the first aspect, the pixel driving method includes:

writing, by the first reset sub-circuit, the first reset voltage provided by the first reset voltage terminal to the control electrode of the driving transistor in response to a control of the first control signal in a first level state;

writing, by the data writing and compensating sub-circuit, the data voltage provided by the data line to the first electrode of the driving transistor in response to a control of the second control signal in a second level state, and writing the data compensating voltage to the control electrode of the driving transistor in response to a control of the light emitting control signal in a second level state; wherein the data compensating voltage is equal to a sum of the data voltage and a threshold voltage of the driving transistor; and writing, by the light emitting control sub-circuit, the first operating voltage provided by the first operating voltage terminal to the first electrode of the driving transistor in response to a control of the light emitting control signal in a first level state; wherein the driving transistor is configured to output a corresponding driving current in response to a control of the data compensating voltage.

DETAIL DESCRIPTION OF EMBODIMENTS

Figure 1:
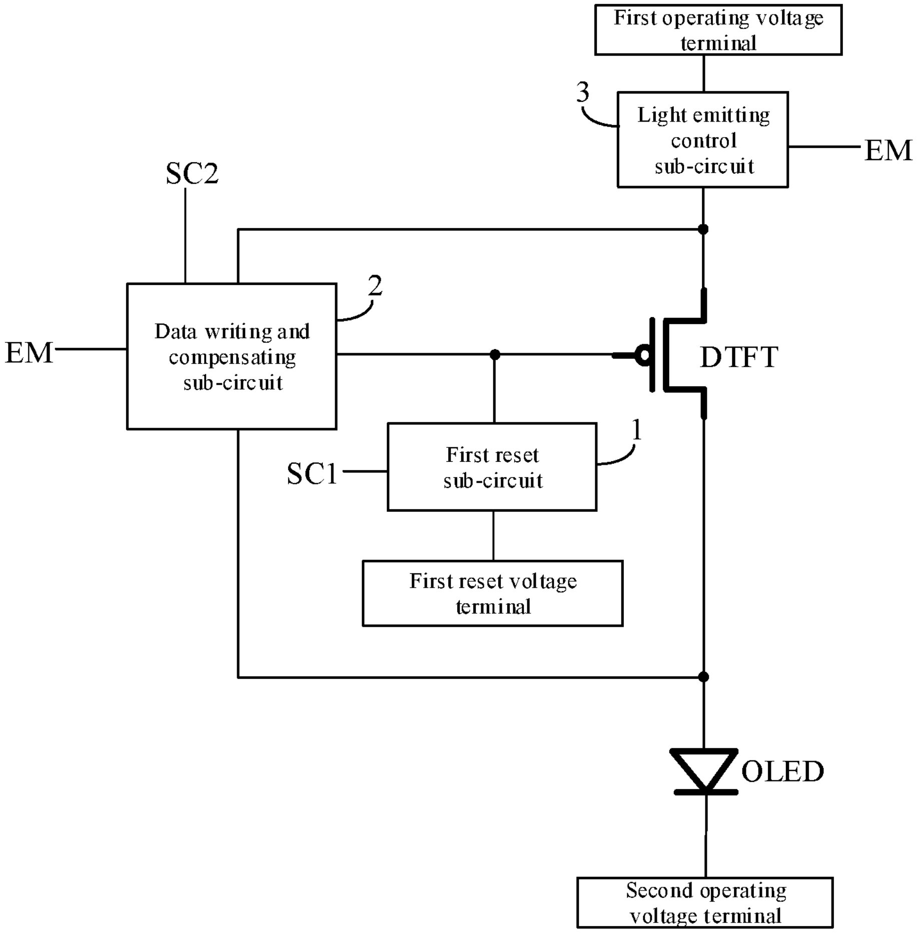
FIG. 1 is a schematic diagram of a circuit structure of a pixel circuit according to an embodiment of the present disclosure.

In order to enable one of ordinary skill in the art to better understand the technical solutions of the present disclosure, a pixel circuit, a driving method thereof, a display substrate and a display apparatus of the present disclosure will be described in further detail with reference to the accompanying drawings.

Example embodiments will be described more fully hereinafter with reference to the accompanying drawings, but may be embodied in different forms and should not be construed as limited to the forms set forth herein. Rather, these embodiments are provided so that the present disclosure will be thorough and complete, and will fully convey the scope of the present disclosure to one of ordinary skill in the art.

The terms used herein are for the purpose of describing particular embodiments only and are not intended to limit the present disclosure. As used herein, the singular forms “a”, “an” and “the” are intended to include a plural form as well, unless the context clearly indicates otherwise. It should be further understood that, the terms of “including” and/or “comprising,” when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It should be further understood that a term, such as that defined in commonly used dictionaries, should be interpreted as having a meaning that is consistent with its meaning in the context of the relevant art and the present disclosure, and should not be interpreted in an idealized or overly formal sense unless expressly so defined herein.

It should be noted that the transistors used in the embodiments of the present disclosure may be thin film transistors or field effect transistors or other devices with the same or similar characteristics. Source and drain electrodes of each transistor are symmetrical, so that the source and drain electrodes are equal to each other. In the embodiments of the present disclosure, to distinguish the source electrode and the drain electrode of the transistor, one of the source and drain electrodes is referred to as a first electrode, the other is referred to as a second electrode, and a gate electrode is referred to as a control electrode.

In addition, any control signal has two level states: a high level state and a low level state. One of a first level state and a second level state in the embodiment of the present disclosure is the high level state, and the other is the low level state. An N-type transistor is turned on in response to a control signal in a high level state and turned off in response to a control signal in a low level state; a P-type transistor is turned on in response to a control signal in a low level state and turned off in response to a control signal in a high level state.

FIG. 1 is a schematic diagram of a circuit structure of a pixel circuit according to an embodiment of the present disclosure. As shown in FIG. 1, the pixel circuit includes: a first reset sub-circuit 1, a data writing and compensating sub-circuit 2, a light emitting control sub-circuit 3 and a driving transistor DTFT; the pixel circuit is provided with a first control signal line SC1 configured to provide a first control signal, a second control signal line SC2 configured to provide a second control signal and a light emitting control signal line EM configured to provide a light emitting control signal.

The first control signal and the second control signal have the same waveform and the second control signal lags behind the first control signal; that is, the first control signal line SC1 and the second control signal line SC2 are the same type of control signal line, and the first control signal and the second control signal may be provided from different signal output terminals of the same driving circuit.

The first reset sub-circuit 1 is coupled to a first reset voltage terminal, a control electrode of the driving transistor DTFT and the first control signal line SC1, and configured to write a first reset voltage provided by the first reset voltage terminal to the control electrode of the driving transistor DTFT in response to a control of the first control signal in a first level state.

The data writing and compensating sub-circuit 2 is coupled to a data line DATA, a first electrode, a second electrode and the control electrode of the driving transistor DTFT, the second control signal line SC2, and the light emitting control signal line EM, and configured to write a data voltage provided from the data line DATA to the first electrode of the driving transistor DTFT in response to a control of the second control signal in a second level state, and write a data compensating voltage to the control electrode of the driving transistor DTFT in response to a control of the light emitting control signal in a second level state, wherein the data compensating voltage is equal to a sum of the data voltage and a threshold voltage of the driving transistor DTFT.

The light emitting control sub-circuit 3 is coupled to a first operating voltage terminal, the first electrode of the driving transistor DTFT, and the light emitting control signal line EM, and configured to write a first operating voltage provided from the first operating voltage terminal to the first electrode of the driving transistor DTFT in response to a control of the light emitting control signal in a first level state.

The second electrode of the driving transistor DTFT is coupled to a first terminal of a light emitting device OLED, and the driving transistor DTFT is configured to output a corresponding driving current in response to a control of the data compensating voltage.

A second terminal of the light emitting device OLED is coupled to a second operating voltage terminal. The light emitting device in the present disclosure refers to a current-driven light emitting element including an organic light emitting diode (OLED), a light emitting diode (LED), or the like. As an example, in the embodiment of the present disclosure, the light emitting device is an OLED, wherein the first terminal and the second terminal of the light emitting device OLED refer to an anode terminal and a cathode terminal, respectively.

In the embodiment of the present disclosure, the entire pixel circuit is only configured with two types of control signal lines, where one type of control signal line includes the first control signal line SC1 and the second control signal line SC2, and the other type of control signal line includes the light emitting control signal line EM. The technical solution of the present disclosure may effectively reduce the type of control signal lines compared with the related art, such that the number of driving circuits required to be provided in a peripheral region is reduced, which is beneficial to the narrow bezel.

In some embodiments, the pixel circuit further includes: a storage capacitor C having a first terminal coupled to the control electrode of the driving transistor DTFT, and a second terminal coupled to the first operating voltage terminal. The storage capacitor is used in a light emitting stage to maintain a stability of a voltage loaded on the control electrode of the driving transistor DTFT.

Figure 2:
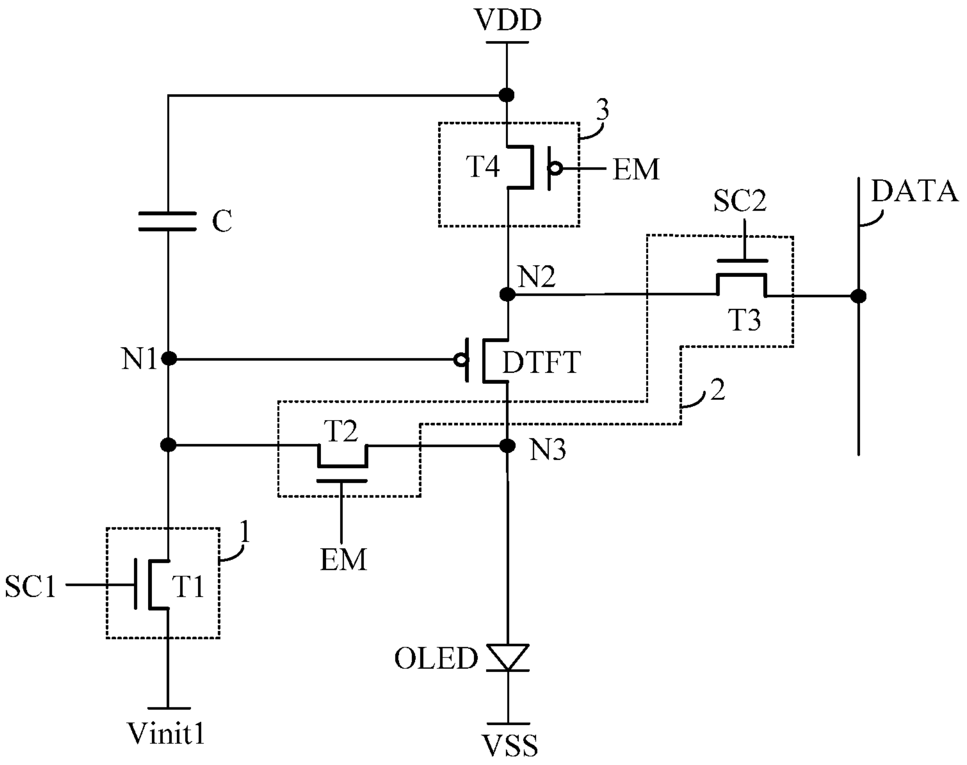
FIG. 2 is a schematic diagram of a circuit structure of another pixel circuit according to an embodiment of the present disclosure.

FIG. 2 is a schematic diagram of a circuit structure of another pixel circuit according to an embodiment of the present disclosure. The pixel circuit shown in FIG. 2 is a specific optional implementation of the pixel circuit shown in FIG. 1, where the first reset sub-circuit 1 includes a first transistor T1, the data writing and compensating sub-circuit 2 includes a second transistor T2 and a third transistor T3, and the light emitting control sub-circuit 3 includes a fourth transistor T4.

A control electrode of the first transistor T1 is coupled to the first control signal line SC1, a first electrode of the first transistor T1 is coupled to the control electrode of the driving transistor DTFT, and a second electrode of the first transistor T1 is coupled to the first reset voltage terminal.

A control electrode of the second transistor T2 is coupled to the light emitting control signal line EM, a first electrode of the second transistor T2 is coupled to the control electrode of the driving transistor DTFT, and a second electrode of the second transistor T2 is coupled to the second electrode of the driving transistor DTFT.

A control electrode of the third transistor T3 is coupled to the second control signal line SC2, a first electrode of the third transistor T3 is coupled to the first electrode of the driving transistor DTFT, and a second electrode of the third transistor T3 is coupled to the data line DATA.

A control electrode of the fourth transistor T4 is coupled to the light emitting control signal line EM, a first electrode of the fourth transistor T4 is coupled to the first operating voltage terminal, and a second electrode of the fourth transistor T4 is coupled to the first electrode of the driving transistor DTFT.

The operation of the pixel circuit shown in FIG. 2 will be described in detail below with reference to a specific timing. The first level state is a low level state, and the second level state is a high level state; the first transistor T1 is an N-type transistor, the second transistor T2 is an N-type transistor, the third transistor T3 is an N-type transistor, the fourth transistor T4 is a P-type transistor, and the driving transistor DTFT is a P-type transistor. The first operating voltage terminal provides a first operating voltage VDD, the second operating voltage terminal provides a second operating voltage VSS, and the first reset voltage terminal provides a first reset voltage Vinit1.

Figure 3:
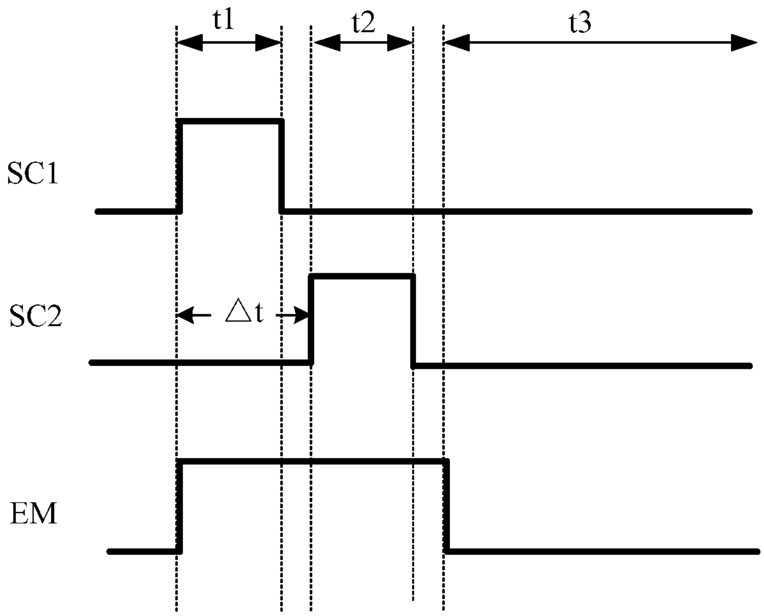
FIG. 3 is a timing diagram illustrating an operation of a pixel circuit according to an embodiment of the present disclosure.

FIG. 3 is a timing diagram illustrating an operation of a pixel circuit according to an embodiment of the present disclosure. As shown in FIG. 3, the operation of the pixel circuit includes: a reset stage t1, a data writing and compensating stage t2 and a light emitting stage t3. The second control signal has the same waveform as the first control signal, and the second control signal lags behind the first control signal by a time length Δt.

In the reset stage t1, the first control signal provided from the first control signal line SC1 is in a high level state, the second control signal provided from the second control signal line SC2 is in a low level state, and the light emitting control signal provided from the light emitting control signal line EM is in a high level state. At this time, the first transistor T1 and the second transistor T2 are turned on, and the third transistor T3 and the fourth transistor T4 are both turned off.

A first reset voltage Vinit1 is written to an N1 node through the first transistor T1 and written to an N3 node through the first transistor T1 and the second transistor T2, to reset the control electrode and the second electrode of the driving transistor DTFT.

In the data writing and compensating stage t2, the first control signal provided by the first control signal line SC1 is in a low level state, the second control signal provided by the second control signal line SC2 is in a high level state, and the light emitting control signal provided by the light emitting control signal line EM is in a high level state. At this time, the second transistor T2 and the third transistor T3 are turned on, and the first transistor T1 and the fourth transistor T4 are both turned off.

A data voltage Vdata provided from the data line DATA is written to an N2 node through the third transistor T3; and the driving transistor DTFT outputs a current which passes through the second transistor T2 to charge the N1 node; and when a voltage at the N1 node rises to Vdata+Vth, the driving transistor DTFT is turned off and the charging ends. Vth is a threshold voltage of the driving transistor DTFT (if the driving transistor DTFT is a P-type transistor, Vth is generally a negative value). At this time, a voltage at the control electrode of the driving transistor DTFT is the data compensating voltage, which is equal to the sum of the data voltage and the threshold voltage of the driving transistor DTFT.

In the light emitting stage t3, the first control signal provided from the first control signal line SC1 is in a low level state, the second control signal provided from the second control signal line SC2 is in a low level state, and the light emitting control signal provided from the light emitting control signal line EM is in a low level state. At this time, the fourth transistor T4 is turned on, and the first, second, and third transistors T1, T2, and T3 are all turned off.

At this time, the first operating voltage VDD is written to the node N2 through the fourth transistor T4. The driving transistor DTFT outputs a driving current I according to a voltage at the node N1 to drive the light emitting device OLED to emit light. It may be derived according to a saturation driving current formula of the driving transistor DTFT:

$$I=K\times(Vgs-Vth)^2=K\times(V\text{data}+Vth-VDD-Vth)^2=K\times(V\text{data}-VDD)^2$$

where K is a constant (a magnitude of which is related to the electrical characteristics of the driving transistor DTFT), and Vgs is a gate-source voltage of the driving transistor DTFT.

As may be seen from the above formula, the driving current of the driving transistor DTFT is related to the data voltage Vdata and the first operating voltage VDD, but is not related to the threshold voltage Vth of the driving transistor DTFT, which protects the driving current flowing through the light emitting device OLED against non-uniformity and drift of the threshold voltage, and thus, effectively improves uniformity of the driving current flowing through the light emitting device OLED. In addition, based on the above, it may be seen that the pixel circuit provided in the embodiments of the present disclosure only needs to undergo the reset stage, the data writing and compensating stage, and the light emitting stage under control of two different types of control signals.

Figure 4:
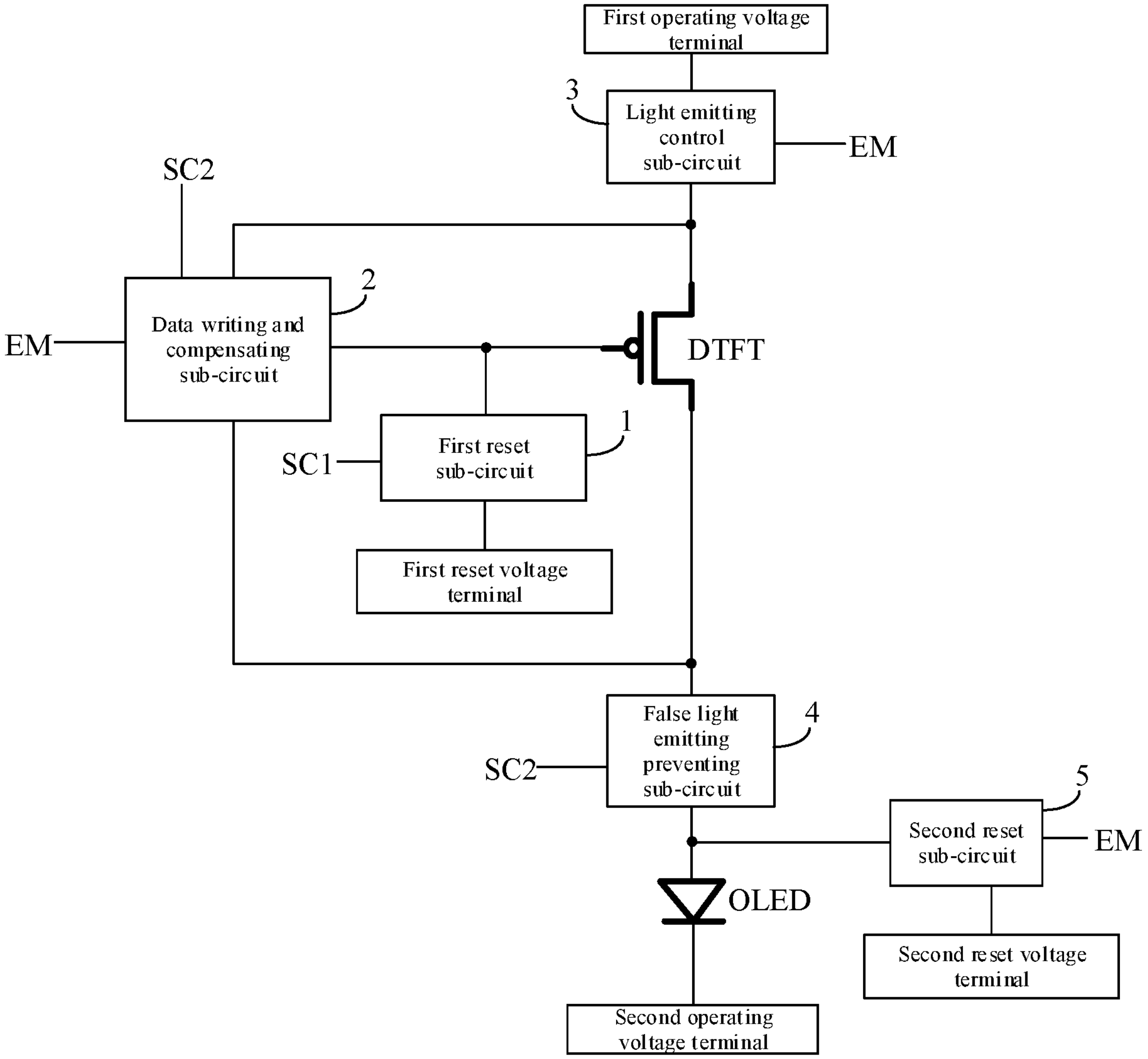
FIG. 4 is a schematic diagram of a circuit structure of another pixel circuit according to an embodiment of the present disclosure.

FIG. 4 is a schematic diagram of a circuit structure of another pixel circuit according to an embodiment of the present disclosure. As shown in FIG. 4, unlike the pixel circuits shown in FIG. 1 and FIG. 2, the pixel circuit shown in FIG. 4 includes not only the first reset sub-circuit 1, the data writing and compensating sub-circuit 2, the light emitting control sub-circuit 3, and the driving transistor DTFT, but also a false light emitting preventing sub-circuit 4.

The false light emitting preventing sub-circuit 4 is disposed between the second electrode of the driving transistor DTFT and the first terminal of the light emitting device OLED, is coupled to the second control signal line SC2, and is configured to electrically connect the second electrode of the driving transistor DTFT to the first terminal of the light emitting device OLED in response to a control of the second control signal in a first level state, and electrically disconnect the second electrode of the driving transistor DTFT from the first terminal of the light emitting device OLED in response to a control of the second control signal in a second level state. In the embodiment of the present disclosure, the false light emitting preventing sub-circuit is provided such that the current output by the driving transistor DTFT in the data writing and compensating stage may be effectively prevented from flowing to the light emitting device OLED, and the light emitting device OLED is prevented from emitting light falsely.

Further, the pixel circuit further includes: a second reset sub-circuit 5 coupled to a second reset voltage terminal, the first terminal of the light emitting device OLED, and the light emitting control signal line EM, and configured to write a second reset voltage provided from the second reset voltage terminal to the first terminal of the light emitting device OLED in response to the light emitting control signal in a second level state.

Figure 5:
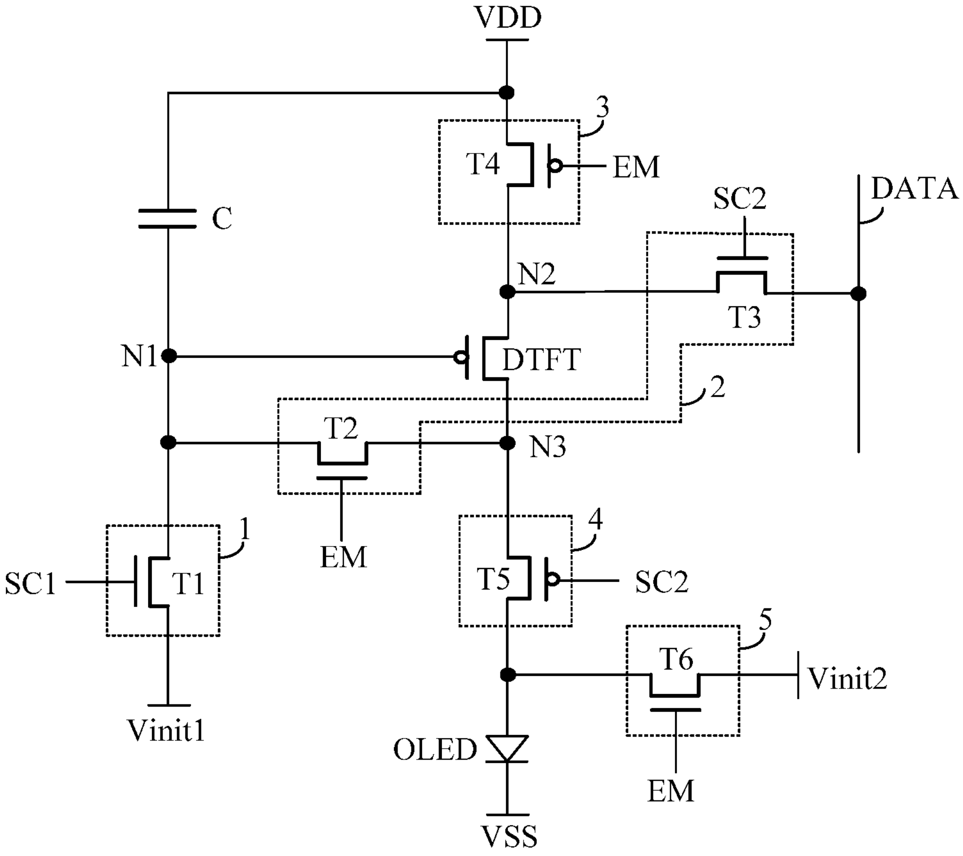
FIG. 5 is a schematic diagram of a circuit structure of another pixel circuit according to an embodiment of the present disclosure.

FIG. 5 is a schematic diagram of a circuit structure of another pixel circuit according to an embodiment of the present disclosure. As shown in FIG. 5, the pixel circuit shown in FIG. 5 is a specific optional implementation based on the pixel circuit shown in FIG. 4, where specific circuit structures of the first reset sub-circuit 1, the data writing and compensating sub-circuit 2, and the light emitting control sub-circuit 3 are shown in FIG. 2. The false light emitting preventing sub-circuit 4 includes a fifth transistor T5, and the second reset sub-circuit 5 includes a sixth transistor T6.

A control electrode of the fifth transistor T5 is coupled to the second control signal line SC2, a first electrode of the fifth transistor T5 is coupled to the second electrode of the driving transistor DTFT, and a second electrode of the fifth transistor T5 is coupled to the first terminal of the light emitting device OLED.

A control electrode of the sixth transistor T6 is coupled to the light emitting control signal line EM, a first electrode of the sixth transistor T6 is coupled to the first terminal of the light emitting device OLED, and a second electrode of the sixth transistor T6 is coupled to the second reset voltage terminal.

In some embodiments, the first transistor T1 is an N-type transistor, the second transistor T2 is an N-type transistor, the third transistor T3 is an N-type transistor, the fourth transistor T4 is a P-type transistor, the fifth transistor T5 is a P-type transistor, the sixth transistor T6 is an N-type transistor, and the driving transistor DTFT is a P-type transistor. The first operating voltage terminal provides the first operating voltage VDD, the second operating voltage terminal provides the second operating voltage VSS, the first reset voltage terminal provides the first reset voltage Vinit1, and the second reset voltage terminal provides the second reset voltage Vinit2.

As an example, the operating timing of the pixel circuit shown in FIG. 5 is the operating timing shown in FIG. 3. Referring to FIG. 3, the operation of the pixel circuit includes: the reset stage, the data writing and compensating stage and the light emitting stage. The second control signal has the same waveform as the first control signal, and the second control signal lags behind the first control signal by a time length Δt.

In the reset stage, the first control signal provided from the first control signal line SC1 is in a high level state, the second control signal provided from the second control signal line SC2 is in a low level state, and the light emitting control signal provided from the light emitting control signal line EM is in a high level state. At this time, the first transistor T1, the second transistor T2, the fifth transistor T5, and the sixth transistor T6 are turned on, and the third transistor T3 and the fourth transistor T4 are both turned off.

The first reset voltage Vinit1 is written to the N1 node through the first transistor T1 and written to the N3 node through the first transistor T1 and the second transistor T2, to reset the control electrode and the second electrode of the driving transistor DTFT. Meanwhile, the second reset voltage Vinit2 is written to the first terminal of the light emitting device OLED through the sixth transistor T6 to reset the anode terminal of the light emitting device OLED.

In the data writing and compensating stage, the first control signal provided by the first control signal line SC1 is in a low level state, the second control signal provided by the second control signal line SC2 is in a high level state, and the light emitting control signal provided by the light emitting control signal line EM is in a high level state. At this time, the second transistor T2, the third transistor T3, and the sixth transistor T6 are turned on, and the first transistor T1, the fourth transistor T4, and the fifth transistor T5 are all turned off.

The data voltage Vdata provided from the data line DATA is written to the N2 node through the third transistor T3, and the driving transistor DTFT outputs a current which passes through the second transistor T2 to charge the N1 node; and when the voltage at the N1 node rises to Vdata+Vth, the driving transistor DTFT is turned off and the charging ends. Vth is a threshold voltage of the driving transistor DTFT (if the driving transistor DTFT is a P-type transistor, Vth is generally a negative value). At this time, a voltage at the control electrode of the driving transistor DTFT is the data compensating voltage, which is equal to the sum of the data voltage and the threshold voltage of the driving transistor DTFT.

Meanwhile, the second reset voltage Vinit2 is written to the first terminal of the light emitting device OLED through the sixth transistor T6 to continuously reset the first terminal of the light emitting device OLED, to prevent a leakage current at the fifth transistor T5 from flowing to the light emitting device OLED.

In the light emitting stage, the first control signal provided from the first control signal line SC1 is in a low level state, the second control signal provided from the second control signal line SC2 is in a low level state, and the light emitting control signal provided from the light emitting control signal line EM is in a low level state. At this time, the fourth transistor T4 and the fifth transistor T5 are both turned on, and the first transistor T1, the second transistor T2, the third transistor T3, and the sixth transistor T6 are all turned off.

At this time, the first operating voltage VDD is written to the node N2 through the fourth transistor T4. The driving transistor DTFT outputs a driving current I according to the voltage at the node N1, which flows to the light emitting device OLED through the fifth transistor T5 to drive the light emitting device OLED to emit light. It may be derived according to a saturation driving current formula of the driving transistor DTFT:

$$I=K\times(Vgs-Vth)^2=K\times(V\text{data}+Vth-VDD-Vth)^2=K\times(V\text{data}-VDD)^2$$

where K is a constant (a magnitude of which is related to the electrical characteristics of the driving transistor DTFT), and Vgs is a gate-source voltage of the driving transistor DTFT.

As may be seen from the above formula, the driving current of the driving transistor DTFT is related to the data voltage Vdata and the first operating voltage VDD, but is not related to the threshold voltage Vth of the driving transistor DTFT, which protects the driving current flowing through the light emitting device OLED against non-uniformity and drift of the threshold voltage, and thus, effectively improves uniformity of the driving current flowing through the light emitting device OLED. In addition, based on the above, it may be seen that the pixel circuit provided in the embodiments of the present disclosure only needs to undergo the reset stage, the data writing and compensating stage, and the light emitting stage under control of two different types of control signals.

In some embodiments, the second reset voltage Vinit2 is greater than or equal to the first reset voltage Vinit1.

When the second reset voltage Vinit2 is equal to the first reset voltage Vinit1, the first reset voltage terminal and the second reset voltage terminal may be the same voltage terminal, which is advantageous for reducing the number of wirings in the display region.

When the second reset voltage Vinit2 is greater than the first reset voltage Vinit1, a decreased value of the brightness of the light emitting device OLED in the reset stage and the data writing and compensating stage becomes small, and a risk of flicker can be effectively reduced. After the light emitting stage of the previous cycle ends and before the light emitting stage of the current cycle starts (i.e. an overall time period throughout the reset stage and the data writing and compensating stage of the current cycle), the brightness of the light emitting device OLED is not suddenly decreased to zero, but gradually decreases; at this time, the light emitting device OLED is corresponding provided with a brightness decline curve, and a decline speed of the brightness of the light emitting device OLED is related to the voltage (i.e., the second reset voltage Vinit2) loaded on the first terminal of the light emitting device OLED, where the greater the second reset voltage Vinit2 is, the slower the brightness of the light emitting device OLED is decreased; if the brightness of the light emitting device OLED is decreased too fast in the time period throughout the reset stage and the data writing and compensating stage of the current cycle, the brightness of the light emitting device OLED has an obvious difference, so that a user may feel flicker of the light emitting device OLED. In view of the above technical problems, in the embodiment of the present disclosure, by increasing the voltage value of the second reset voltage Vinit2, the decline speed of the brightness of the light emitting device OLED is reduced in the time period throughout the reset stage and the data writing and compensating stage, so that the risk of flicker in the light emitting device OLED may be effectively reduced.

It should be noted that compared with the pixel circuit shown in FIGS. 1 and 2, the false light emitting preventing sub-circuit and the second reset sub-circuit are provided in the pixel circuit shown in FIGS. 4 and 5, and there are still two types of control signal lines arranged in the pixel circuit, that is, no additional control signal line is provided.

Based on the same inventive concept, the embodiment of the present disclosure further provides a display substrate. The display substrate includes: the pixel circuit provided in any one of the above embodiments. For the specific description of the pixel circuit, reference may be made to the corresponding contents in the foregoing embodiments, and details are not repeated here. For the pixel circuit provided by the embodiment of the present disclosure, only two driving circuits need to be provided on the display substrate.

Figure 6:
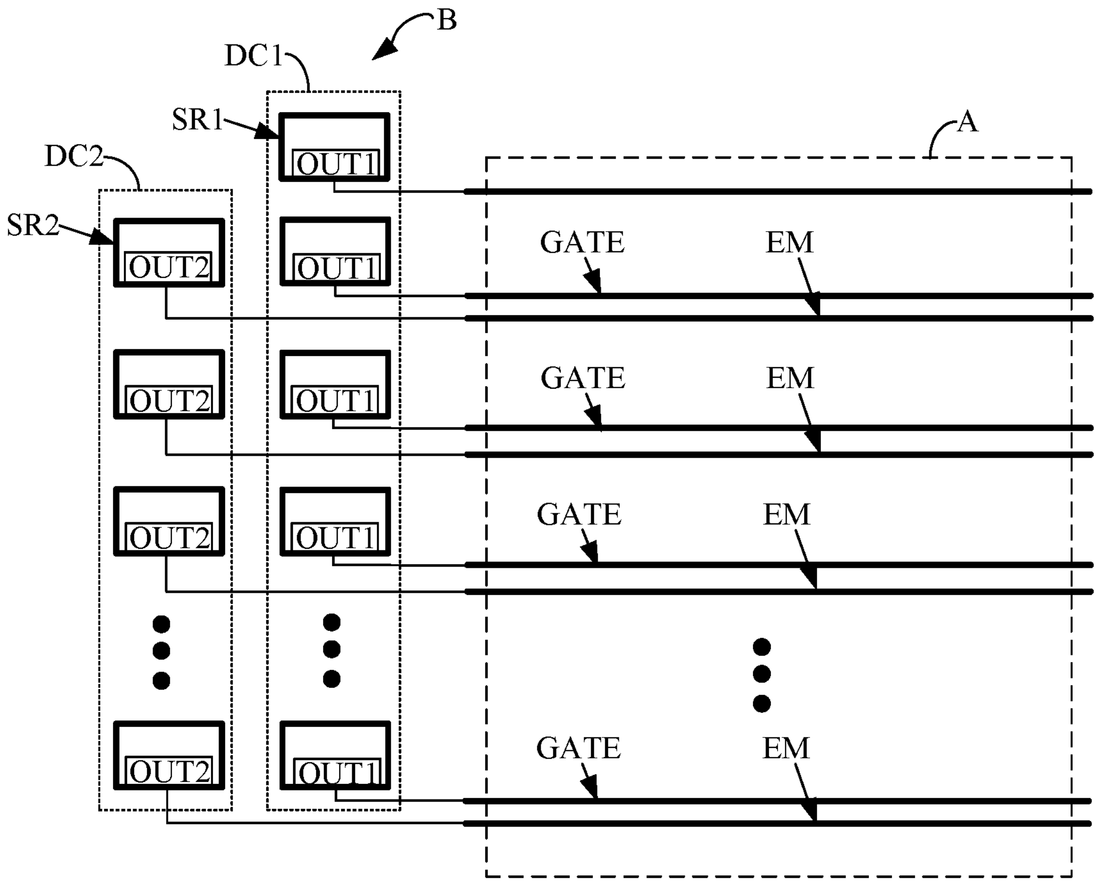
FIG. 6 is a schematic diagram of a structure of a display substrate according to an embodiment of the present disclosure.

FIG. 6 is a schematic diagram of a structure of a display substrate according to an embodiment of the present disclosure. As shown in FIG. 6, the display substrate includes a display region A which includes a plurality of gate lines GATE, a plurality of data lines (not shown), a plurality of light emitting control signal lines EM, and a plurality of pixel units defined by the plurality of gate lines GATE and the plurality of data lines, each pixel unit corresponds to one gate line GATE, one data line, and one light emitting control signal line EM, and includes a pixel circuit and a light emitting device.

The second control signal line configured for the pixel circuit is a gate line GATE corresponding to the pixel unit to which the pixel circuit belongs; the first control signal line configured for the pixel circuit is a previous gate line GATE before the gate line GATE corresponding to the pixel unit to which the pixel circuit belongs.

In some embodiments, the display substrate further includes a peripheral region B, including: a gate driving circuit DC1 and a light emitting control driving circuit DC2; the gate driving circuit DC1 is configured with a plurality of first signal output terminals OUT1 which are capable of sequentially outputting gate scan signals and are in one-to-one correspondence with the gate lines GATE, each first signal output terminal OUT1 is coupled to a corresponding gate line GATE, and at this time, the first control signal and the second control signal are both gate scan signals; the light emitting control driving circuit DC2 is configured with a plurality of second signal output terminals OUT2 which are capable of sequentially outputting light emitting control signals and are in one-to-one correspondence with the light emitting control signal lines EM, and each second signal output terminal OUT2 is coupled to the corresponding light emitting control signal line EM.

The gate driving circuit DC1 and the light emitting control driving circuit DC2 may be formed on the display substrate through a GOA (Gate Drive On Array) process, and the specific process flow is not described in detail here.

As a specific example, N rows of pixel units, (N+1) gate lines GATE, and N light emitting control signal lines EM are provided in the display region; the gate driving circuit DC1 is configured with (N+1) first signal output terminals OUT1 for the (N+1) gate lines GATE; the light emitting control driving circuit DC2 is configured with N second signal output terminals OUT2 for the N light emitting control signal lines EM, and the pixel units located in the nth row correspond to the (n+1)th gate line GATE and the nth light emitting control signal line EM.

At this time, the first control signal line configured for the pixel circuit in the nth row is the nth gate line GATE, the second control signal line configured for the pixel circuit in the nth row is the (n+1)th gate line GATE, and the light emitting control signal line EM configured for the pixel circuit in the nth row is the nth light emitting control signal line EM.

In some embodiments, the gate driving circuit DC1 includes (N+1) cascaded first shift registers SR1, each first shift register SR1 is configured with one first signal output terminal OUT1; the light emitting control driving circuit DC2 includes N cascaded second shift registers SR2, and each second shift register SR2 is configured with one second signal output terminal OUT2.

Figure 7:
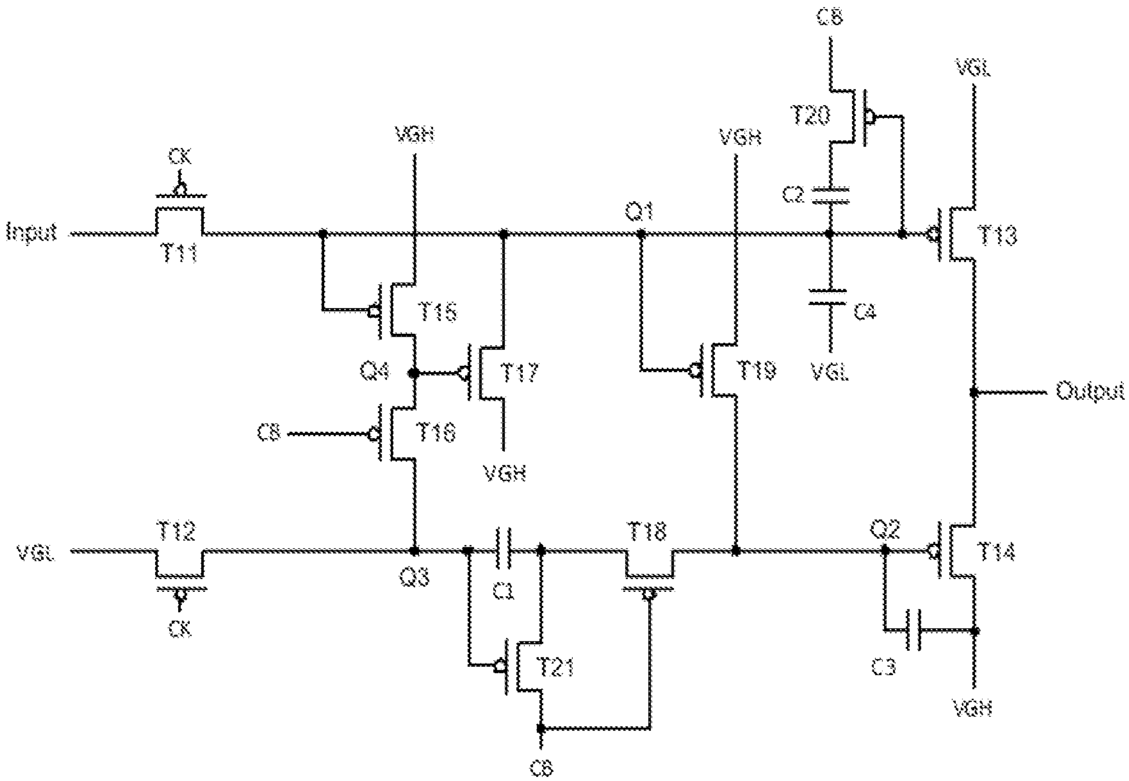
FIG. 7 is a schematic diagram of a circuit structure of a stage of shift register in a driving circuit according to the embodiment of the present disclosure.
Figure 8:
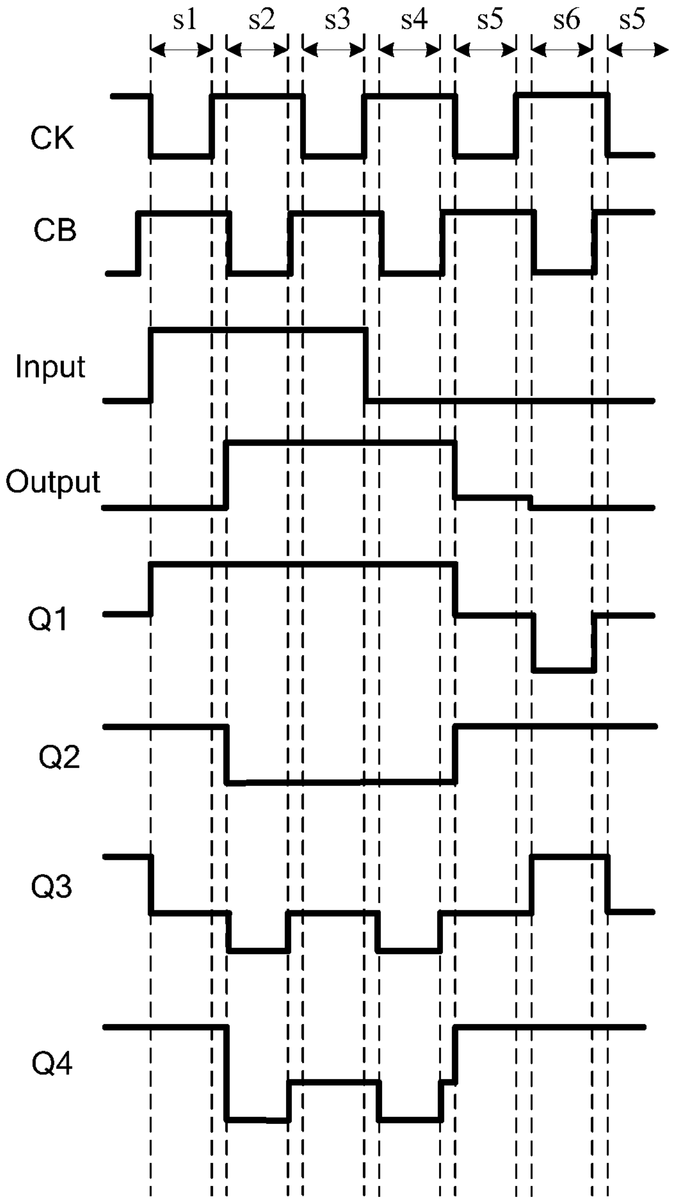
FIG. 8 is a timing diagram illustrating an operation of the shift register shown in FIG. 7.

FIG. 7 is a schematic diagram of a circuit structure of a stage of shift register in a driving circuit according to the embodiment of the present disclosure; FIG. 8 is a timing diagram illustrating an operation of the shift register shown in FIG. 7. As shown in FIG. 7 and FIG. 8, the shift register shown in FIG. 7 has an 11T4C structure, that is, the shift register includes 11 transistors (an eleventh transistor T11 to a twenty-first transistor T21) and 4 capacitors (a first capacitor C1 to a fourth capacitor C4).

As an example, the transistors in the shift register shown in FIG. 7 are P-type transistors. The operating of the shift register shown in FIG. 7 adopting the operating timing shown in FIG. 8 includes the following stages:

In a first stage s1: a first clock signal provided by a first clock signal line CK is in a low level state, a second clock signal provided by a second clock signal line CB is in a high level state, and an input signal provided by a signal input terminal Input is in a high level state. At this time, the eleventh transistor T11, the twelfth transistor T12, and the twenty-first transistor T21 are all turned on, and the thirteenth transistor T13, the fourteenth transistor T14, the fifteenth transistor T15, the sixteenth transistor T16, the seventeenth transistor T17, the eighteenth transistor T18, the nineteenth transistor T19, and the twentieth transistor T20 are all turned off. A signal output terminal Output is still in the low level state.

In a second stage s2: the first clock signal provided by the first clock signal line CK is in a high level state, the second clock signal provided by the second clock signal line CB is in a low level state, and the input signal provided by the signal input terminal Input is in a high level state. At this time, the fourteenth transistor T14, the sixteenth transistor T16, the seventeenth transistor T17, the eighteenth transistor T18, and the twenty-first transistor T21 are all turned on, and the eleventh transistor T11, the twelfth transistor T12, the thirteenth transistor T13, the fifteenth transistor T15, the nineteenth transistor T19, and the twentieth transistor T20 are all turned off. The signal output terminal Output outputs a high level signal.

In a third stage s3: the first clock signal provided by the first clock signal line CK is in a low level state, the second clock signal provided by the second clock signal line CB is in a high level state, and the input signal provided by the signal input terminal Input is in a high level state. At this time, the eleventh transistor T11, the twelfth transistor T12, the fourteenth transistor T14, the seventeenth transistor T17, and the twenty-first transistor T21 are all turned on, and the thirteenth transistor T13, the fifteenth transistor T15, the sixteenth transistor T16, the eighteenth transistor T18, the nineteenth transistor T19, and the twentieth transistor T20 are all turned off. The signal output terminal Output outputs a high level signal.

In a fourth stage s4: the first clock signal provided by the first clock signal line CK is in a high level state, the second clock signal provided by the second clock signal line CB is in a low level state, and the input signal provided by the signal input terminal Input is in a low level state. At this time, the fourteenth transistor T14, the sixteenth transistor T16, the seventeenth transistor T17, the eighteenth transistor T18, and the twenty-first transistor T21 are all turned on, and the eleventh transistor T11, the twelfth transistor T12, the thirteenth transistor T13, the fifteenth transistor T15, the nineteenth transistor T19, and the twentieth transistor T20 are all turned off. The signal output terminal Output outputs a high level signal. The operation of the shift register in the fourth stage t4 is identical to the operation of the shift register in the second stage s2.

In a fifth stage s5: the first clock signal provided by the first clock signal line CK is in a low level state, the second clock signal provided by the second clock signal line CB is in a high level state, and the input signal provided by the signal input terminal Input is in a low level state. At this time, the eleventh transistor T11, the twelfth transistor T12, the thirteenth transistor T13, the fifteenth transistor T15, the nineteenth transistor T19, the twentieth transistor T20, and the twenty-first transistor T21 are all turned on, and the fourteenth transistor T14, the sixteenth transistor T16, the seventeenth transistor T17, and the eighteenth transistor T18 are all turned off. The signal output terminal Output outputs a low level signal.

In a sixth stage s6: the first clock signal provided by the first clock signal line CK is in a high level state, the second clock signal provided by the second clock signal line CB is in a low level state, and the input signal provided by the signal input terminal Input is in a low level state. At this time, the thirteenth transistor T13, the fifteenth transistor T15, the sixteenth transistor T16, the eighteenth transistor T18, the nineteenth transistor T19, and the twentieth transistor T20 are all turned on, and the eleventh transistor T11, the twelfth transistor T12, the fourteenth transistor T14, the seventeenth transistor T17, and the twenty-first transistor T21 are all turned off. The signal output terminal Output outputs a low level signal.

Then, the fifth stage s5 and the sixth stage s6 are performed alternately until the first stage s1 of the next cycle starts (i.e., the first clock signal provided by the first clock signal line CK is in a low level state, the second clock signal is in a high level state, and the input signal provided by the signal input terminal is in a high level state). Level states at nodes Q1 to Q4 in the respective stages may be seen from FIG. 8.

A width of a pulse (referred to as a "pulse width" for short, represents a duration of a high level) of the signal output from the signal output terminal Output of the shift register is determined by a pulse width of the input signal provided from the signal input terminal. Generally, a rising edge of the input signal provided by the signal input terminal Input is level with a certain rising edge of the first clock signal, a falling edge of the input signal provided by the signal input terminal Input is level with a certain falling edge of the first clock signal, so that a pulse width of the signal output by the signal output terminal Output is approximately equal to that of the input signal provided by the signal input terminal Input. That is, the pulse width of the signal output from the signal output terminal Output may be adjusted by adjusting the pulse width of the input signal provided from the signal input terminal Input.

It should be noted that when the pulse width of the input signal provided by the signal input terminal Input is wide, the shift register repeatedly and alternately performs the second stage s2 and the third stage s3, and the signal output terminal Output continuously outputs a high level signal, that is, the pulse width of the signal output by the signal output terminal is also wide.

Figure 9:
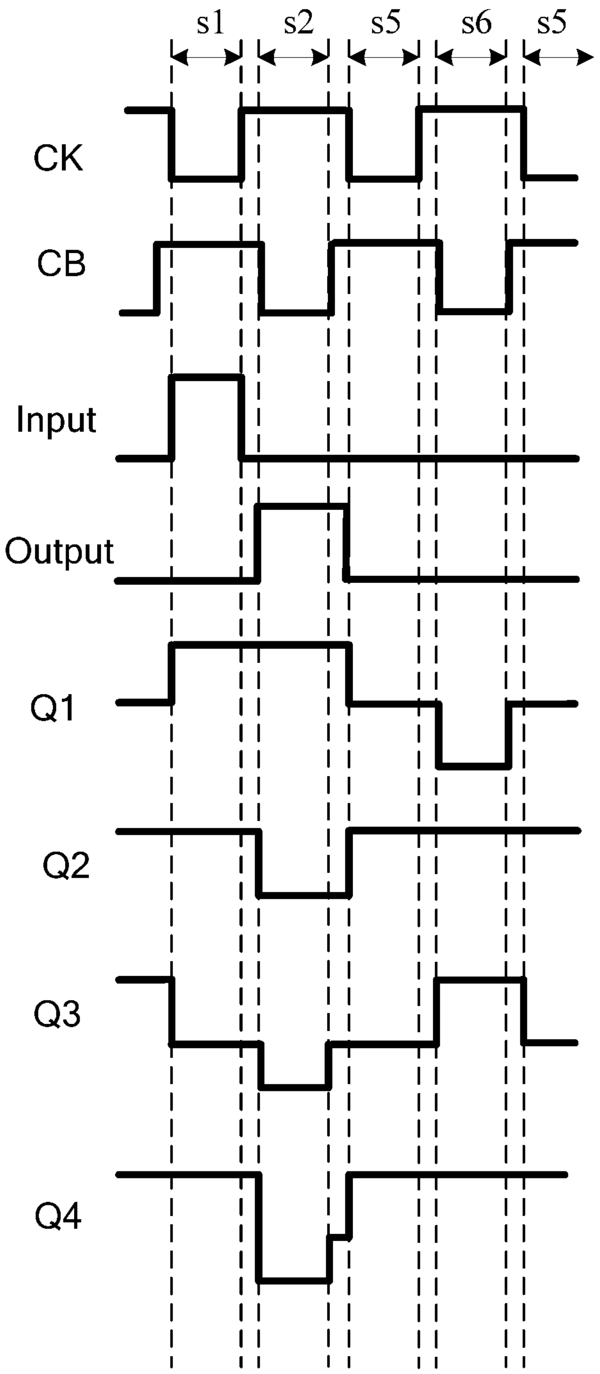
FIG. 9 is a timing diagram illustrating another operation of the shift register shown in FIG. 7.

FIG. 9 is a timing diagram illustrating another operation of the shift register shown in FIG. 7. As shown in FIG. 9, the pulse width of the input signal provided by the signal input terminal Input is at a minimum value, that is, the pulse width of the input signal provided by the signal input terminal Input is equal to a duration during which the first clock signal is in a low level state in one cycle. At this time, the operation of the shift register does not include the third stage t3 and the fourth stage t4 in FIG. 8, and the pulse width of the signal output by the signal output terminal is at the minimum value.

It should be noted that in the embodiment of the present disclosure, both a first shift register SR1 located in the gate driving circuit DC1 and a second shift register SR2 located in the light emitting control driving circuit DC2 may adopt the shift register shown in FIG. 7, that is, the first shift register SR1 and the second shift register SR2 may adopt the same circuit structure. At this time, the number of times for manufacturing different types of shift registers may be reduced, the process is optimized, and the production efficiency is improved.

As a specific solution, the first shift register SR1 located in the gate driving circuit DC1 and the second shift register SR2 located in the light emitting control driving circuit DC2 both adopt the circuit structure of the shift register shown in FIG. 7, the first shift register SR1 operates by adopting the operating timing shown in FIG. 9, and the second shift register SR2 operates by adopting the operating timing shown in FIG. 8.

Alternatively, in the embodiment of the present disclosure, the first shift register SR1 located in the gate driving circuit DC1 and the second shift register SR2 located in the light emitting control driving circuit DC2 may also have different circuit structures. In practical applications, the circuit structures of the first shift register SR1 and the second shift register SR2 may be designed according to actual needs, and the detailed description will be given below in conjunction with an alternative embodiment.

Figure 10A:
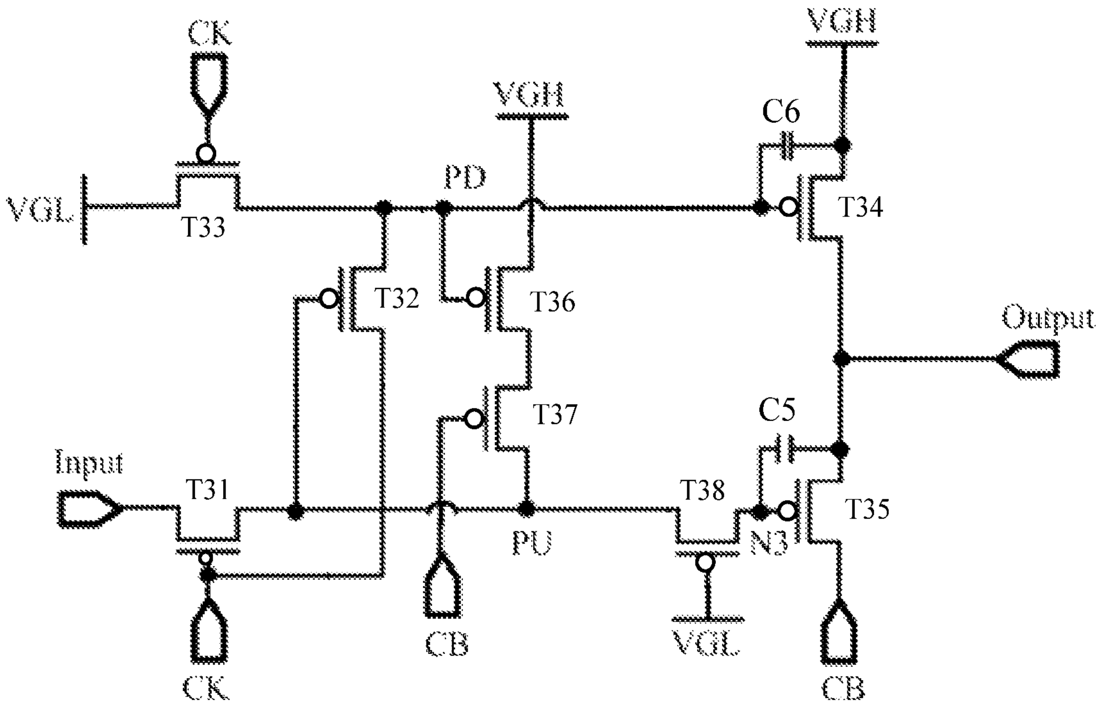
FIG. 10A is a schematic diagram of a circuit structure of a first stage shift register in a gate driving circuit according to an embodiment of the present disclosure.
Figure 10B:
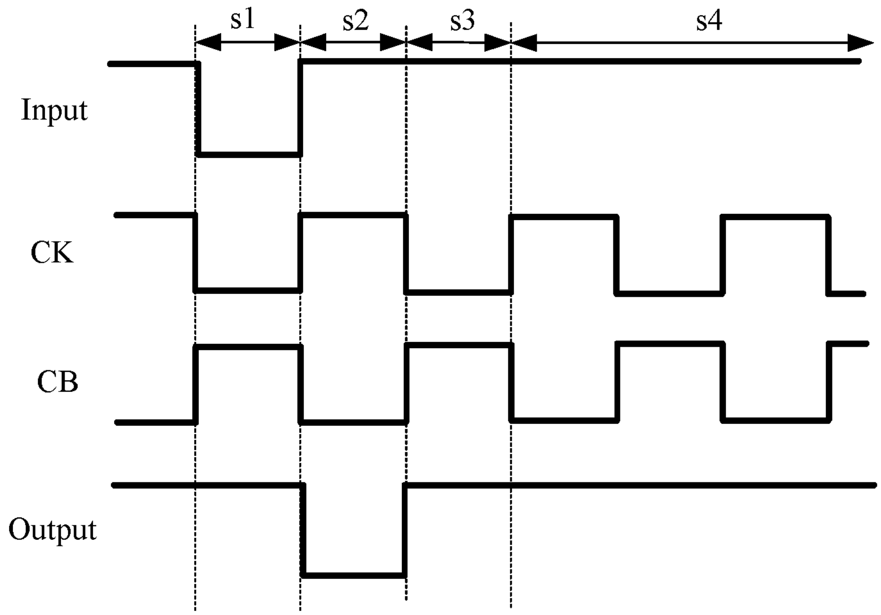
FIG. 10B is a timing diagram illustrating an operation of the first stage shift register shown in FIG. 10A.
Figure 11A:
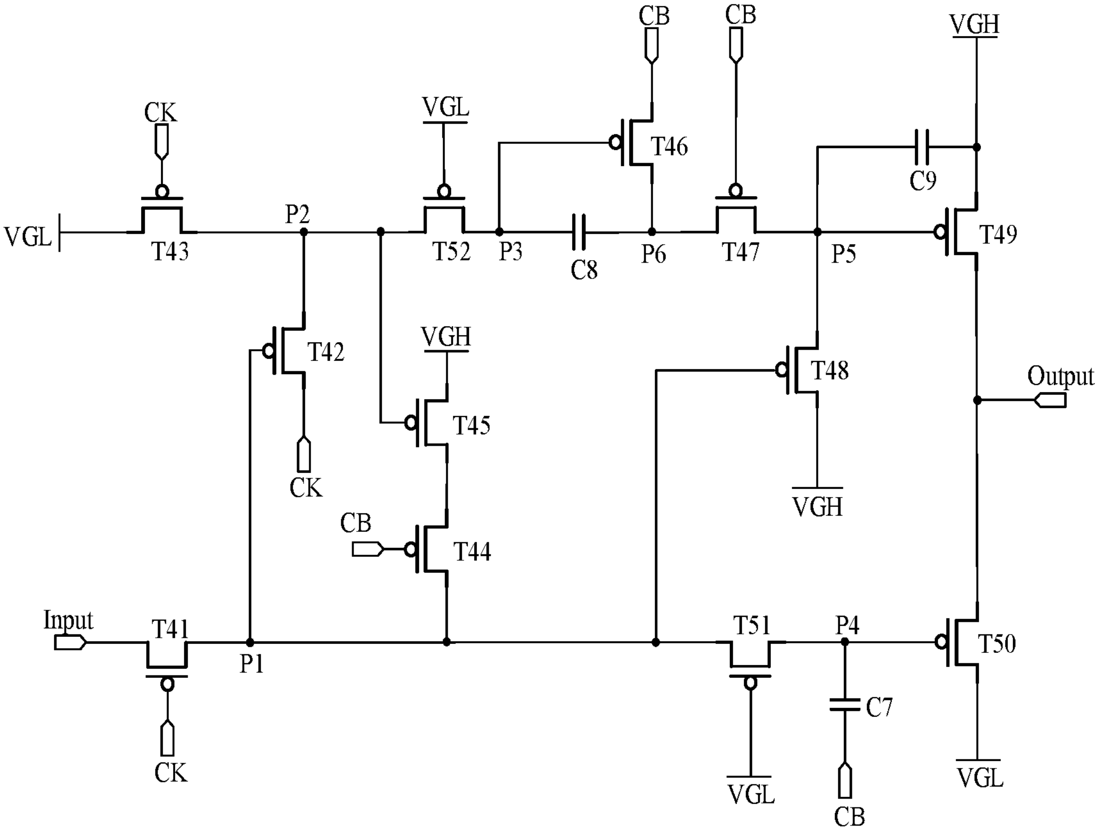
FIG. 11A is a schematic diagram illustrating a circuit structure of a second stage shift register in a light emitting control driving circuit according to an embodiment of the present disclosure.
Figure 11B:
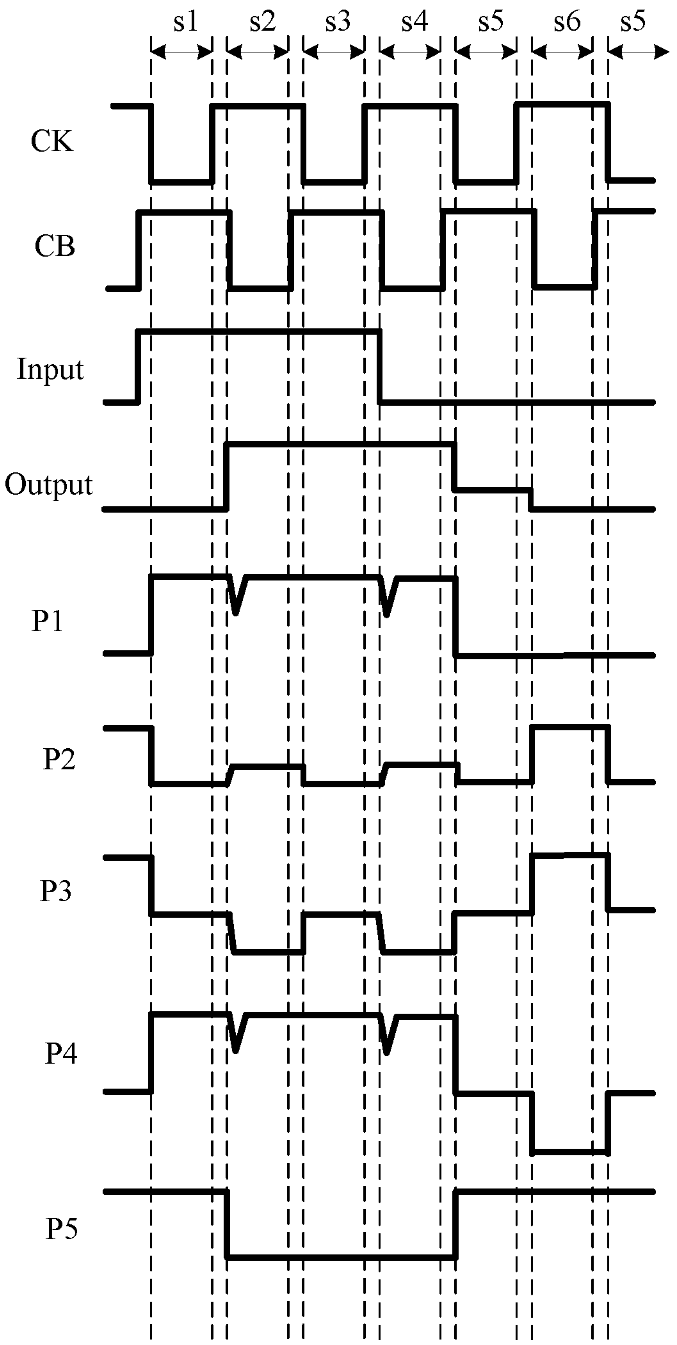
FIG. 11B is a timing diagram illustrating an operation of the second stage shift register shown in FIG. 11A.

FIG. 10A is a schematic diagram of a circuit structure of a first stage shift register in a gate driving circuit according to an embodiment of the present disclosure; FIG. 10B is a timing diagram illustrating an operation of the first stage shift register shown in FIG. 10A; FIG. 11A is a schematic diagram illustrating a circuit structure of a second stage shift register in a light emitting control driving circuit according to the embodiment of the present disclosure; FIG. 11B is a timing diagram illustrating an operation of the second stage shift register shown in FIG. 11A. Referring to FIG. 10A to FIG. 11B, the first stage shift register in the gate driving circuit shown in FIG. 10A has an 8T2C structure, i.e., including 8 transistors (a thirty-first transistor T31 to a thirty-eighth transistor T38) and 2 capacitors (a fifth capacitor C5 to a sixth capacitor C6); the second stage shift register in the light emitting control driving circuit shown in FIG. 11A has a 12T3C structure, i.e., including 12 transistors (a forty-first transistor to a fifty-second transistor) and 3 capacitors (a seventh capacitor C7 to a ninth capacitor C9).

Referring to FIG. 10B, the operation of the first stage shift register shown in FIG. 10A includes: a first stage s1, a second stage s2, a third stage s3 and a fourth stage s4. The thirty-first to thirty-eighth transistors T31 to T38 are all P-type transistors.

In the first stage s1, the input signal terminal Input provides a low level signal, the first clock signal line CK provides a low level signal, and the second clock signal line CB provides a high level signal. At this time, the thirty-first transistor T31, the thirty-second transistor T32, the thirty-third transistor T33, the thirty-fourth transistor T34, the thirty-fifth transistor T35, the thirty-sixth transistor T36, and the thirty-eighth transistor T38 are all turned on, and the thirty-seventh transistor T37 is turned off, a pull-up node PU and a pull-down node PD are both in a low level state. A high level operating voltage VGH is written into the signal output terminal Output through the thirty-fourth transistor T34, and a high level signal provided by the second clock signal line CB is written into the signal output terminal Output through the thirty-fifth transistor T35, so that the signal output terminal Output outputs a high level signal.

In the second stage s2, the input signal terminal Input provides a high level signal, the first clock signal line CK provides a high level signal, and the second clock signal line CB provides a low level signal. At this time, the thirty-second transistor T32, the thirty-fifth transistor T35, and the thirty-seventh transistor T37 are all turned on, and the thirty-first transistor T31, the thirty-third transistor T33, the thirty-fourth transistor T34, the thirty-sixth transistor T36, and the thirty-eighth transistor T38 are all turned off. The pull-up node PU is in a low level state, and the pull-down node PD is in a high level state; a low level signal provided by the second clock signal line CB is written to the signal output terminal Output through the thirty-fifth transistor T35, so that the signal output terminal Output outputs a low level signal.

It should be noted that the signal provided by the second clock signal terminal changes from the high level to the low level, so that a voltage at the node N3 is pulled down to a lower level under the bootstrap action of the fifth capacitor C5; at this time, a voltage VGL at a control electrode of the thirty-eighth transistor T38 is greater than the voltage at the node N3 (i.e., the voltage VGL at the gate electrode is at a high level compared to a voltage at a source electrode), so that the thirty-eighth transistor T38 is turned off. Since the thirty-eighth transistor T38 is turned off, the excessively low voltage at the node N3 is prevented from being written to the pull-up node PU, and the thirty-first transistor T31 and the thirty-second transistor T32 are prevented from being in a high voltage state, so that the service lives of the thirty-first transistor T31 and the thirty-second transistor T32 may be prolonged.

In the third stage s3, the input signal terminal Input provides a high level signal, the first clock signal line CK provides a low level signal, and the second clock signal line CB provides a high level signal. At this time, the thirty-first transistor T31, the thirty-third transistor T33, the thirty-fourth transistor T34, the thirty-sixth transistor T36, and the thirty-eighth transistor T38 are all turned on, and the thirty-second transistor T32, the thirty-fifth transistor T35, and the thirty-seventh transistor T37 are all turned off. The pull-up node PU is in a high level state, and the pull-down node PD is in a low level state; the high level operating voltage VGH is written to the signal output terminal Output through the thirty-fourth transistor T34.

In the fourth stage s4, the input signal terminal Input provides a high level signal, the first clock signal line CK provides a clock signal switchable between high and low levels, and the second clock signal line CB provides a clock signal switchable between high and low levels. The pull-up node PU is always in a high level state, the pull-down node PD is always in a low level state, the thirty-fourth transistor T34 is kept to be turned on, the thirty-fifth transistor T35 is kept to be turned off, and the signal output terminal Output keeps outputting a high level signal.

It should be noted that the output low level signal is an active level of the gate scan signal in the operating timing shown in FIG. 10B; it will be appreciated by one of ordinary skill in the art that the type of transistors in the first shift register shown in FIG. 10A may be changed and the signals may be changed to be active in a high level period, i.e., in the first shift register shown in FIG. 10A, the output high level signal is an active level of the gate scan signal, and the details will not be described here.

Referring to FIG. 11B, the operation of the second stage shift register shown in FIG. 11A includes: a first stage s1, a second stage s2, a third stage s3, a fourth stage s4, a fifth stage s5 and a sixth stage s6. The forty-first transistor T41 to the fifty-second transistor T52 are all P-type transistors.

In the first stage s1, the first clock signal provided by the first clock signal line CK is in a low level state, the second clock signal provided by the second clock signal line CB is in a high level state, and the signal provided by the signal input terminal Input is in a high level state.

Specifically, the first clock signal is in a low level state, and both the forty-first transistor T41 and the forty-third transistor T43 are turned on; the second clock signal is in a high level state and the forty-fourth transistor T44 is turned off.

The signal input terminal Input provides a signal in a high level state, and the signal is written into the first node P1 through the forty-first transistor T41, the first node P1 is in a high level state, and the forty-second transistor T42 is in an off state; meanwhile, the second node P2 is discharged through the forty-third transistor T43, and is in a low level state (a voltage at the second node P2 is slightly higher than the VGL); a gate-source voltage of the fifty-second transistor T52 is negative, the fifty-second transistor T52 is in an on state, the third node P3 is discharged through the fifty-second transistor T52, and the third node P3 is in a low level state (a voltage at the third node P3 is slightly higher than the voltage at the second node P2); since the third node P3 is in a low level state, the forty-sixth transistor T46 is turned on. At the end of the first stage s1, the first node P1 is in a high level state, the second node P2 is in a low level state, the third node P3 is in a low level state, and the fourth node P4 is in a high level state.

The second clock signal is in a high level state and the forty-seventh transistor T47 is turned off. Since the third node P3 is in a low level state, a the forty-sixth transistor T46 is turned on, the second clock signal in a high level state is written to a sixth node P6 through the forty-sixth transistor T46, and the sixth node P6 is in a high level state. Meanwhile, since both the first node P1 and the fourth node P4 are in a high level state, both the forty-eighth transistor T48 and the fiftieth transistor T50 are turned off.

Since both the forty-seventh transistor T47 and the forty-eighth transistor T48 are turned off, a fifth node P5 is in a floating state, the fifth node P5 is kept to be in the high level state in the previous stage (the last stage of the previous cycle), and the forty-ninth transistor T49 is turned off.

Since both the forty-ninth transistor T49 and the fiftieth transistor T50 are turned off, the first signal output terminal Output is in a floating state, and the first signal output terminal Output is kept to be in the low level state in the previous stage (the last stage of the previous cycle), that is, the first signal output terminal Output outputs a low level signal.

In the second stage s2, the first clock signal provided by the first clock signal line CK is in a high level state, the second clock signal provided by the second clock signal line CB is in a low level state, and the signal provided by the signal input terminal Input is in a high level state.

Specifically, the first clock signal is in a high level state, and both the forty-first transistor T41 and the forty-third transistor T43 are turned off; the second clock signal is in a low level state and the forty-fourth transistor T44 is turned on.

Without considering the influence of the first clock signal on the voltage at the third node P3, since the forty-third transistor T43 is turned off, the third node P3 is in a floating state to maintain the low level state in the first stage s1.

It should be noted that at the beginning of the second stage s2, the second clock signal is switched from a high level to a low level, and under the bootstrap action of the seventh capacitor C7, voltages at the fourth node P4 and the first node P1 are pulled down, and at this time, there is a risk that the forty-second transistor T42 is falsely turned on. In the present application, even if the forty-second transistor T42 is falsely turned on for a short time, since the fifty-second transistor T52 is disposed between the second node P2 and the third node P3, the voltage at the third node P3 is minimally affected by the first clock signal in a high level state, the level at the third node P3 may be always kept in a low level state, and the forty-fifth transistor T45 is kept to be turned on.

Since the forty-fourth transistor T44 and the forty-fifth transistor T45 are both turned on, the high level voltage VGH charges the first node P1 and the fourth node P4 through the forty-fifth transistor T45 and the forty-fourth transistor T44, so that the first node P1 and the fourth node P4 are in a high level state, and the forty-second transistor T42, which is falsely turned on, is also immediately switched to an off state. At the end of the second stage s2, the first node P1 is in a high level state, the second node P2 is in a low level state, the third node P3 is in a low level state, and the fourth node P4 is in a high level state.

The second clock signal is in a low level state and the forty-seventh transistor T47 is turned on. Since the third node P3 is in a low level state, the forty-sixth transistor T46 is turned on, the second clock signal in a low level state is written to the sixth node P6 through the forty-sixth transistor T46, and the sixth node P6 is in a low level state. Since the voltage at the sixth node P6 is switched from a high level state to a low level state, the voltage at the third node P3 is pulled down to a lower level under the bootstrap action of an eighth capacitor C8. It should be noted that even if the forty-second transistor T42 is falsely turned on so that the first clock signal in a high level state pulls up the second node P2 and the third node P3, due to the existence of the fifty-second transistor T52, the voltage at the third node P3 tends to be pulled down as a whole, so as to further ensure that the third node P3 is always in a low level state in the second stage s2, and in the process of pulling down the voltage at the third node P3 by the eighth capacitor C8, the voltage at the third node P3 is pulled down from a value approximately equal to VGL to a value approximately equal to 2VGL, at this time, the gate-source voltage of the fifty-second transistor T52 is greater than a threshold voltage of the fifty-second transistor T52, and the fifty-second transistor T52 is switched from an on state to an off state.

Since the forty-sixth transistor T46 and the forty-seventh transistor T47 are turned on, the second clock signal in a low level state is written to a fifth node P5 through the forty-sixth transistor T46 and the forty-seventh transistor T47, and the fifth node P5 is in a low level state. Meanwhile, since both the first node P1 and the fourth node P4 are in a high level state, both the forty-eighth transistor T48 and the fiftieth transistor T50 are turned off.

Since the forty-ninth transistor T49 is in an on state and the fiftieth transistor T50 is in an off state, the high level voltage VGH is written to the first signal output terminal Output through the forty-ninth transistor T49, and the first signal output terminal Output outputs a high level signal.

In the third stage s3, the first clock signal provided by the first clock signal line CK is in a low level state, the second clock signal provided by the second clock signal line CB is in a high level state, and the signal provided by the signal input terminal Input is in a high level state.

The operation of the forty-first to forty-fifth transistors T41 to T45 in the third stage s3 is identical to that in the first stage s1, and specifically, reference may be made to the corresponding description of the first stage s1.

The second clock signal is in a high level state and the forty-seventh transistor T47 is turned off. Since the third node P3 is in a low level state, the forty-sixth transistor T46 is turned on, the second clock signal in a high level state is written to the sixth node P6 through the forty-sixth transistor T46, and the sixth node P6 is in a high level state. Since the forty-third transistor T43 is turned on, the low level voltage VGL is written to the third node P3 through the forty-third transistor T43 and the fifty-second transistor T52, and the third node P3 is still in a low level state and the voltage at the third node P3 is approximately equal to VGL. Meanwhile, since both the first node P1 and the fourth node P4 are in a high level state, both the forty-eighth transistor T48 and the fiftieth transistor T50 are turned off.

Since both the forty-seventh transistor T47 and the forty-eighth transistor T48 are turned off, the fifth node P5 is in a floating state, the fifth node P5 is kept to be in the low level state in the previous stage (the second stage s2), and the forty-ninth transistor T49 is kept to be turned on.

Since the forty-ninth transistor T49 is in an on state and the fiftieth transistor T50 is in an off state, the high level voltage VGH is written to the first signal output terminal Output through the forty-ninth transistor T49, and the first signal output terminal Output is kept to output a high level signal.

In the fourth stage s4, the first clock signal provided by the first clock signal line CK is in a high level state, the second clock signal provided by the second clock signal line CB is in a low level state, and the signal provided by the signal input terminal Input is in a low level state.

The operation of the forty-first to forty-fifth transistors T41 to T45 in the fourth stage s4 is identical to that in the second stage s2, and specifically, reference may be made to the corresponding description of the second stage s2.

The second clock signal is in a low level state and the forty-seventh transistor T47 is turned on. Since the third node P3 is in a low level state, the forty-sixth transistor T46 is turned on, the second clock signal in a low level state is written to the sixth node P6 through the forty-sixth transistor T46, and the sixth node P6 is in a low level state. Since the voltage at the sixth node P6 is switched from a high level state to a low level state, the voltage at the third node P3 is pulled down to a lower level under the bootstrap action of the eighth capacitor C8. It should be noted that even if the forty-second transistor T42 is falsely turned on so that the first clock signal in a high level state pulls up the third node P3, due to the existence of the fifty-second transistor T52, the influence of the eighth capacitor C8 on the third node P3 is predominant, so that the voltage at the third node P3 tends to be pulled down as a whole, so as to further ensure that the third node P3 is always in a low level state during the second stage s2, and the voltage at the third node P3 is pulled down from a value approximately equal to VGL to a value approximately equal to 2VGL during the eighth capacitor C8 pulls down the voltage at the third node P3.

Since the forty-sixth transistor T46 and the forty-seventh transistor T47 are turned on, the second clock signal in a low level state is written to the fifth node P5 through the forty-sixth transistor T46 and the forty-seventh transistor T47, and the fifth node P5 is in a low level state. Meanwhile, since both the first node P1 and the fourth node P4 are in a high level state, both the forty-eighth transistor T48 and the fiftieth transistor T50 are turned off.

Since the forty-ninth transistor T49 is in an on state and the fiftieth transistor T50 is in an off state, the high level voltage VGH is written to the first signal output terminal Output through the forty-ninth transistor T49, and the first signal output terminal Output outputs a high level signal.

In the fifth stage s5, the first clock signal provided by the first clock signal line CK is in a low level state, the second clock signal provided by the second clock signal line CB is in a high level state, and the signal provided by the signal input terminal Input is in a low level state.

Specifically, the first clock signal is in a low level state, and both the forty-first transistor T41 and the forty-third transistor T43 are turned on; the second clock signal is in a high level state and the forty-fourth transistor T44 is turned off.

A signal in a low level state provided by the signal input terminal Input is written into the first node P1 through the forty-first transistor T41, the first node P1 is in a low level state, the forty-second transistor T42 is in an on state, the second node P2 is discharged through the forty-second transistor T42 and the forty-third transistor T43, and the second node P2 is in a low level state; the gate-source voltage of the fifty-second transistor T52 is a negative, the fifty-second transistor T52 is in an on state, the third node P3 is discharged through the second node P2, and the third node P3 is in a low level state; since the third node P3 is in a low level state, the forty-fifth transistor T45 is turned on.

At the end of the fifth stage s5, the first node P1 is in a low level state, the second node P2 is in a low level state, the third node P3 is in a low level state, and the fourth node P4 is in a low level state.

The second clock signal is in a high level state and the forty-seventh transistor T47 is turned off. Since the third node P3 is in a low level state, the forty-sixth transistor T46 is turned on, the second clock signal in a high level state is written to the sixth node P6 through the forty-sixth transistor T46, and the sixth node P6 is in a high level state. Since the forty-third transistor T43 is turned on, the low level voltage VGL is written to the third node P3 through the forty-third transistor T43 and the fifty-second transistor T52, and the third node P3 is still in a low level state and the voltage at the third node P3 is approximately equal to VGL.

Since the first node P1 is in a low level state, the forty-eighth transistor T48 is turned on, the high level voltage VGH is written to the fifth node P5 through the forty-eighth transistor T48, the fifth node P5 is in a high level state, and the forty-ninth transistor T49 is turned off. Meanwhile, the fourth node P4 is in a low level state and the voltage at the fourth node P4 is approximately equal to VGL, the fiftieth transistor T50 is turned on, the first signal output terminal Output is discharged through the fiftieth transistor T50, when the voltage at the first signal output terminal Output is reduced to VN4-Vth_M10 (i.e. when a gate-source power voltage of the fiftieth transistor T50 is equal to Vth_M10, where VN4 is the voltage at the fourth node P4 and is approximately equal to VGL, Vth_M10 is a threshold voltage of the fiftieth transistor T50 and is negative), the fiftieth transistor T50 is switched to an off state, and the first signal output terminal Output outputs a low level signal and the voltage at the first signal output terminal Output is approximately equal to VGL-Vth_M10.

It should be noted that in the fifth stage s5, when the voltage at the first signal output terminal Output rises and drifts, the gate-source voltage of the fiftieth transistor T50 is less than the threshold voltage of the fiftieth transistor T50, at this time, the fiftieth transistor T50 is turned on again so that the voltage at the first signal output terminal Output is reduced; and when the gate-source voltage of the fiftieth transistor T50 is equal to the threshold voltage of the fiftieth transistor T50, the fiftieth transistor T50 is turned off again.

In the sixth stage s6, the first clock signal provided by the first clock signal line CK is in a high level state, the second clock signal provided by the second clock signal line CB is in a low level state, and the signal provided by the signal input terminal Input is in a low level state.

Specifically, the first clock signal is in a high level state, and both the forty-first transistor T41 and the forty-third transistor T43 are turned off; the second clock signal is in a low level state and the forty-fourth transistor T44 is turned on.

When the second clock signal is switched from a high level to a low level, the voltage at the fourth node P4 is pulled down from a value approximately equal to VGL to a value approximately equal to 2VGL under the bootstrap action of the seventh capacitor C7, and the first node P1 and the fourth node P4 are both in a low level state. The forty-second transistor T42 is in an on state (the forty-second transistor T42 is normally turned on), the first clock signal in a high level state charges the second node P2 through the forty-second transistor T42, the second node P2 and the third node P3 are in a high level state, and the forty-fifth transistor T45 is turned off.

At the end of the sixth stage s6, the first node P1 is in a low level state, the second node P2 is in a high level state, the third node P3 is in a high level state, and the fourth node P4 is in a low level state.

The second clock signal is in a low level state and the forty-seventh transistor T47 is turned on. Since the third node P3 is in a high level state, the forty-sixth transistor T46 is turned off. Since the first node P1 is in a low level state, the forty-eighth transistor T48 is turned on, the high level voltage VGH is written to the fifth node P5 through the forty-eighth transistor T48, the fifth node P5 is in a high level state, and the forty-ninth transistor T49 is turned off, meanwhile, since the forty-seventh transistor T47 is turned on, the high level voltage VGH may charge the sixth node P6 through the forty-eighth transistor T48 and the forty-seventh transistor T47, and the sixth node P6 is in a high level state.

Since the second clock signal is switched from a high level state to a low level state, the voltage at the fourth node P4 is pulled down from a value approximately equal to VGL to a value approximately equal to 2VGL under the bootstrap action of the seventh capacitor C7, the fiftieth transistor T50 is turned on again, and the first signal output terminal Output is discharged through the fiftieth transistor T50; without considering an impedance of the fiftieth transistor T50, the voltage at the first signal output terminal Output may be reduced to VGL, the gate-source voltage of the fiftieth transistor T50 is always less than the threshold voltage of the fiftieth transistor T50, the fiftieth transistor T50 is continuously turned on, the first signal output terminal Output outputs a low level signal and the voltage at the first signal output terminal Output is approximately equal to VGL.

It should be noted that in the sixth stage s6, when the voltage at the fourth node P4 is pulled down from a value approximately equal to VGL to being approximately equal to 2VGL by the seventh capacitor C7, a gate-source voltage of the fifty-first transistor T51 is greater than a threshold voltage of the fifty-first transistor T51, and at this time, the fifty-first transistor T51 is switched from an on state to an off state, which prevents the too low voltage (approximately equal to VGL) at the fourth node P4 from being written into the first node P1. Therefore, the forty-first transistor T41 and the forty-second transistor T42 are prevented from being in a high voltage state, and the service lives of the forty-first transistor T41 and the forty-second transistor T42 may be further prolonged.

In the following process, the shift register alternately performs the fifth stage s5 and the sixth stage s6 until the next cycle starts. It should be noted that during the shift register alternately performs the fifth stage s5 and the sixth stage s6, although the voltage at the fourth node P4 is switched between a value approximately equal to VGL and a value approximately equal to 2VGL, the voltage at the first signal output terminal Output is always approximately equal to VGL.

It should be noted that the second control signal provided by the second control signal line SC2 in the embodiment of the present disclosure may also be provided by the second shift register shown in FIG. 11A, and one of ordinary skill in the art only needs to adjust the Input pulse width or the like in FIG. 11B, which is not described in detail here. It will be appreciated by one of ordinary skill in the art that the first stage shift register in the gate driving circuit and the second stage shift register in the light emitting control driving circuit may adopt other circuit structures in the embodiments of the present disclosure, which is not described here by way of example.

Based on the same inventive concept, the embodiment of the present disclosure further provides a display apparatus, which includes the display substrate provided by the foregoing embodiment.

The display apparatus may be any product or component with a display function, such as an electronic paper, an OLED panel, an AMOLED panel, a mobile phone, a tablet computer, a television, a display, a notebook computer, a digital photo frame, and a navigator or the like.

Figure 12:
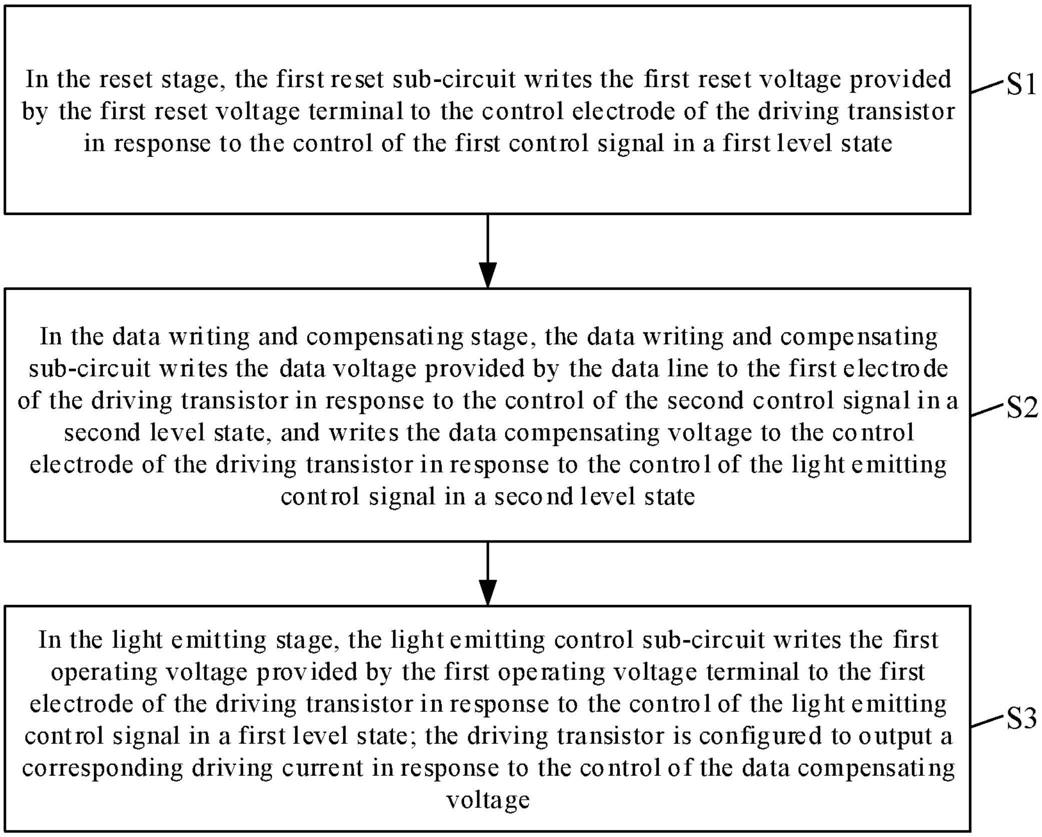
FIG. 12 is a flowchart of a pixel driving method according to an embodiment of the present disclosure.

Based on the same inventive concept, the embodiment of the present disclosure also provides a pixel driving method. FIG. 12 is a flowchart of a pixel driving method provided in an embodiment of the present disclosure. As shown in FIG. 12, the pixel driving method is based on the pixel circuit provided in the foregoing embodiment, and specifically includes:

Step S1, in the reset stage, the first reset sub-circuit writes the first reset voltage provided by the first reset voltage terminal to the control electrode of the driving transistor in response to the control of the first control signal in a first level state.

Step S2, in the data writing and compensating stage, the data writing and compensating sub-circuit writes the data voltage provided by the data line to the first electrode of the driving transistor in response to the control of the second control signal in a second level state, and writes the data compensating voltage to the control electrode of the driving transistor in response to the control of the light emitting control signal in a second level state.

The data compensating voltage is equal to the sum of the data voltage and the threshold voltage of the driving transistor.

Step S3, in the light emitting stage, the light emitting control sub-circuit writes the first operating voltage provided by the first operating voltage terminal to the first electrode of the driving transistor in response to the control of the light emitting control signal in a first level state; the driving transistor is configured to output a corresponding driving current in response to the control of the data compensating voltage.

For the specific description of the above steps S1 to S3, reference may be made to the corresponding contents in the foregoing embodiments, and details are not repeated herein.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. It will, therefore, be understood by one of ordinary skill in the art that various changes in form and details may be made therein without departing from the scope of the present disclosure as set forth in the appended claims.

What is claimed is:

1. A pixel circuit, comprising: a first reset sub-circuit, a data writing and compensating sub-circuit, a light emitting control sub-circuit and a driving transistor; wherein the pixel circuit is provided with a first control signal line configured to provide a first control signal, a second control signal line configured to provide a second control signal and a light emitting control signal line configured to provide a light emitting control signal; the first control signal and the second control signal have a same waveform and the second control signal lags behind the first control signal;

the first reset sub-circuit is coupled to a first reset voltage terminal, a control electrode of the driving transistor and the first control signal line, and configured to write a first reset voltage provided by the first reset voltage terminal to the control electrode of the driving transistor in response to a control of the first control signal in a first level state;

the data writing and compensating sub-circuit is coupled to a data line, a first electrode, a second electrode and the control electrode of the driving transistor, the second control signal line, and the light emitting control signal line, and configured to write a data voltage provided from the data line to the first electrode of the driving transistor in response to a control of the second control signal in a second level state, and write a data compensating voltage to the control electrode of the driving transistor in response to a control of the light emitting control signal in a second level state, wherein the data compensating voltage is equal to a sum of the data voltage and a threshold voltage of the driving transistor;

the light emitting control sub-circuit is coupled to a first operating voltage terminal, the first electrode of the driving transistor, and the light emitting control signal line, and configured to write a first operating voltage provided from the first operating voltage terminal to the first electrode of the driving transistor in response to a control of the light emitting control signal in a first level state; and the second electrode of the driving transistor is coupled to a first terminal of a light emitting device, and the driving transistor is configured to output a corresponding driving current in response to a control of the data compensating voltage.

2. The pixel circuit according to claim 1, wherein the first reset sub-circuit comprises a first transistor, the data writing and compensating sub-circuit comprises a second transistor and a third transistor, and the light emitting control sub-circuit comprises a fourth transistor;

a control electrode of the first transistor is coupled to the first control signal line, a first electrode of the first transistor is coupled to the control electrode of the driving transistor, and a second electrode of the first transistor is coupled to the first reset voltage terminal;

a control electrode of the second transistor is coupled to the light emitting control signal line, a first electrode of the second transistor is coupled to the control electrode of the driving transistor, and a second electrode of the first transistor is coupled to the second electrode of the driving transistor;

a control electrode of the third transistor is coupled to the second control signal line, a first electrode of the third transistor is coupled to the first electrode of the driving transistor, and a second electrode of the third transistor is coupled to the data line; and a control electrode of the fourth transistor is coupled to the light emitting control signal line, a first electrode of the fourth transistor is coupled to the first operating voltage terminal, and a second electrode of the fourth transistor is coupled to the first electrode of the driving transistor.

3. The pixel circuit according to claim 2, wherein the first level state is a low level state and the second level state is a high level state; and the first transistor is an N-type transistor, the second transistor is an N-type transistor, the third transistor is an N-type transistor, the fourth transistor is a P-type transistor, and the driving transistor is a P-type transistor.

4. The pixel circuit according to claim 3, further comprising:

a false light emitting preventing sub-circuit between the second electrode of the driving transistor and the first terminal of the light emitting device, and coupled to the second control signal line, and configured to electrically connect the second electrode of the driving transistor to the first terminal of the light emitting device in response to a control of the second control signal in a first level state, and electrically disconnect the second electrode of the driving transistor from the first terminal of the light emitting device in response to a control of the second control signal in a second level state.

5. The pixel circuit according to claim 4, wherein the false light emitting preventing sub-circuit comprises a fifth transistor; and a control electrode of the fifth transistor is coupled to the second control signal line, a first electrode of the fifth transistor is coupled to the second electrode of the driving transistor, and a second electrode of the fifth transistor is coupled to the first terminal of the light emitting device.

6. The pixel circuit according to claim 5, wherein the first level state is a low level state and the second level state is a high level state; and the fifth transistor is a P-type transistor.

7. The pixel circuit according to claim 6, further comprising:

a second reset sub-circuit coupled to a second reset voltage terminal, the first terminal of the light emitting device, and the light emitting control signal line, and configured to write a second reset voltage provided from the second reset voltage terminal to the first terminal of the light emitting device in response to a control of the light emitting control signal in a second level state.

8. The pixel circuit according to claim 1, further comprising a storage capacitor;

wherein a first terminal of the storage capacitor is coupled to the control electrode of the driving transistor, and a second terminal of the storage capacitor is coupled to the first operating voltage terminal.

9. The pixel circuit according to claim 8, further comprising:

a false light emitting preventing sub-circuit between the second electrode of the driving transistor and the first terminal of the light emitting device, and coupled to the second control signal line, and configured to electrically connect the second electrode of the driving transistor to the first terminal of the light emitting device in response to a control of the second control signal in a first level state, and electrically disconnect the second electrode of the driving transistor from the first terminal of the light emitting device in response to a control of the second control signal in a second level state.

10. The pixel circuit according to claim 9, wherein the false light emitting preventing sub-circuit comprises a fifth transistor; and a control electrode of the fifth transistor is coupled to the second control signal line, a first electrode of the fifth transistor is coupled to the second electrode of the driving transistor, and a second electrode of the fifth transistor is coupled to the first terminal of the light emitting device.

11. The pixel circuit according to claim 10, wherein the first level state is a low level state and the second level state is a high level state; and the fifth transistor is a P-type transistor.

12. The pixel circuit according to claim 9, further comprising:

a second reset sub-circuit coupled to a second reset voltage terminal, the first terminal of the light emitting device, and the light emitting control signal line, and configured to write a second reset voltage provided from the second reset voltage terminal to the first terminal of the light emitting device in response to a control of the light emitting control signal in a second level state.

13. The pixel circuit according to claim 12, wherein the second reset sub-circuit comprises a sixth transistor; and a control electrode of the sixth transistor is coupled to the light emitting control signal line, a first electrode of the sixth transistor is coupled to the first terminal of the light emitting device, and a second electrode of the sixth transistor is coupled to the second reset voltage terminal.

14. The pixel circuit according to claim 13, wherein the first level state is a low level state and the second level state is a high level state; and the sixth transistor is an N-type transistor.

15. The pixel circuit according to claim 14, wherein the second reset voltage is greater than or equal to the first reset voltage.

16. A display substrate, comprising: the pixel circuit according to claim 1.

17. The display substrate according to claim 16, wherein the display substrate comprises a display region in which a plurality of gate lines, a plurality of data lines, a plurality of light emitting control signal lines, and a plurality of pixel units defined by the plurality of gate lines and the plurality of data lines are arranged, each pixel unit corresponds to one gate line, one data line, and one light emitting control signal line, and comprises the pixel circuit and the light emitting device;

the second control signal line configured for the pixel circuit is a gate line corresponding to a pixel unit to which the pixel circuit belongs; and the first control signal line configured for the pixel circuit is a previous gate line before the gate line corresponding to the pixel unit to which the pixel circuit belongs.

18. The display substrate according to claim 17, further comprising a peripheral region in which a gate driving circuit and a light emitting control driving circuit are arranged;

the gate driving circuit is provided with a plurality of first signal output terminals configured to sequentially output gate scan signals, the plurality of first signal output terminals are in one-to-one correspondence with the gate lines, and each first signal output terminal is coupled to a corresponding gate line; and the light emitting control driving circuit is provided with a plurality of second signal output terminals configured to sequentially output light emitting control signals, the plurality of second signal output terminals are in one-to-one correspondence with the light emitting control signal lines, and each second signal output terminal is coupled to a corresponding light emitting control signal line.

19. A display apparatus, comprising: the display substrate according to claim 16.

20. A pixel driving method based on the pixel circuit according to claim 1, wherein the pixel driving method comprises:

writing, by the first reset sub-circuit, the first reset voltage provided by the first reset voltage terminal to the control electrode of the driving transistor in response to a control of the first control signal in a first level state;

by the data writing and compensating sub-circuit, writing the data voltage provided by the data line to the first electrode of the driving transistor in response to a control of the second control signal in a second level state, and writing the data compensating voltage to the control electrode of the driving transistor in response to a control of the light emitting control signal in a second level state; wherein the data compensating voltage is equal to a sum of the data voltage and a threshold voltage of the driving transistor; and writing, by the light emitting control sub-circuit, the first operating voltage provided by the first operating voltage terminal to the first electrode of the driving transistor in response to a control of the light emitting control signal in a first level state; wherein the driving transistor is configured to output a corresponding driving current in response to a control of the data compensating voltage.

* * * * *